(12) United States Patent
Sugishita et al.

(10) Patent No.: US 11,447,170 B2
(45) Date of Patent: Sep. 20, 2022

(54) STEERING COLUMN AND STEERING DEVICE

(71) Applicant: NSK Ltd., Tokyo (JP)

(72) Inventors: Suguru Sugishita, Maebashi (JP); Masaru Oosawa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/287,371

(22) PCT Filed: Oct. 18, 2019

(86) PCT No.: PCT/JP2019/041146
§ 371 (c)(1),
(2) Date: Apr. 21, 2021

(87) PCT Pub. No.: WO2020/085243
PCT Pub. Date: Apr. 30, 2020

(65) Prior Publication Data
US 2021/0387664 A1 Dec. 16, 2021

(30) Foreign Application Priority Data
Oct. 22, 2018 (JP) .............................. JP2018-198411

(51) Int. Cl.
*B62D 1/19* (2006.01)
(52) U.S. Cl.
CPC .................... *B62D 1/192* (2013.01)
(58) Field of Classification Search
CPC ..................................................... B62D 1/192
See application file for complete search history.

(56) References Cited

U.S. PATENT DOCUMENTS

| 4,998,999 A * | 3/1991 | Yuzuriha | B62D 1/192 280/780 |
| 2010/0300238 A1* | 12/2010 | Ridgway | B62D 1/192 74/493 |

(Continued)

FOREIGN PATENT DOCUMENTS

| JP | 10-203381 A | 8/1998 |
| JP | 2008-230555 A | 10/2008 |

(Continued)

OTHER PUBLICATIONS

International Search Report (PCT/ISA/210) issued in PCT Application No. PCT/JP2019/041146 dated Dec. 24, 2019 with English translation (five (5) pages).

(Continued)

*Primary Examiner* — Drew J Brown
(74) *Attorney, Agent, or Firm* — Crowell & Moring LLP

(57) ABSTRACT

The outer column 25 has a front-side small-diameter tubular portion 37 into which the inner column 24 is press fitted. The inner-circumferential surface of the front-side small-diameter tubular portion 37 and the outer-circumferential surface of the inner column 24 come in contact with an interference fit at only a plurality of contact locations separated in the circumferential direction. At least one location in the axial direction of the column-side bracket 26 is welded to the outer-circumferential surface of the front-side small-diameter tubular portion 37 at only two weld locations that are close in the circumferential direction.

11 Claims, 26 Drawing Sheets

(56) References Cited

U.S. PATENT DOCUMENTS

2013/0136385 A1    5/2013  Re et al.
2013/0327176 A1*  12/2013  Domig .................. B62D 1/192
                                                        74/492
2018/0208232 A1*   7/2018  Kwon ................... B62D 1/195

FOREIGN PATENT DOCUMENTS

| JP | 2012-40906 A | 3/2012 | | |
| JP | 2012-171480 A | 9/2012 | | |
| JP | 2013-136385 A | 7/2013 | | |
| JP | 2017-81518 A | 5/2017 | | |
| JP | 2017-140976 A | 8/2017 | | |
| WO | WO-2005120930 A1 * | 12/2005 | ............. | B62D 1/192 |
| WO | WO-2019149714 A1 * | 8/2019 | ............. | B62D 1/184 |

OTHER PUBLICATIONS

Japanese-language Written Opinion (PCT/ISA/237) issued in PCT Application No. PCT/JP2019/041146 dated Dec. 24, 2019 (seven (7) pages).

* cited by examiner

STEERING COLUMN AND STEERING DEVICE

TECHNICAL FIELD

The present invention relates to a steering column having a function of absorbing an impact load at the time of a secondary collision, and a steering device provided with the steering column.

BACKGROUND ART

FIG. 23 illustrates an example of a steering device for an automobile. A steering wheel 1 is attached to the rear-side end portion of a steering shaft 2. The steering shaft 2 is rotatably supported on the inner-diameter side of a tubular steering column 3 supported by the vehicle body. The rotational motion of the steering wheel 1 is transmitted to a pinion shaft 7 of a steering gear unit 6 via the steering shaft 2, a universal joint 4a, an intermediate shaft 5, and another universal joint 4b. The rotational motion of the pinion shaft 7 is converted into a linear motion of a rack shaft (not illustrated) of the steering gear unit 6. As a result, a pair of tie rods 8 is pushed and pulled, and a steering angle is applied to a pair of left and right steered wheels according to the amount of operation of the steering wheel 1.

With respect to the steering device, the front-rear direction, the width direction, and the vertical direction are the front-rear direction, the width direction, and the vertical direction of the vehicle body to which the steering device is assembled.

FIGS. 24 to 26 illustrate a more specific structure of a steering device as described in JP 2013-136385A. This steering device has a function of adjusting the height position of the steering wheel 1 attached to the rear-side end portion of the steering shaft 2a and a function of absorbing an impact load at the time of a secondary collision due to a collision accident of an automobile.

The steering column 3a includes a tubular inner column 9 arranged on the front side and a tubular outer column 10 arranged on the rear side. The rear-side portion of the inner column 9 is internally fitted into the front-side portion of the outer column 10 by press fitting. The inner column 9 has ridges 11 that protrude toward the outside in the radial direction and extend in the axial direction at four locations at equal intervals in the circumferential direction of the outer-circumferential surface of the rear-side portion. The outer-circumferential surface of the inner column 9 comes in contact with (fits with) the inner-circumferential surface of the outer column 10 with an interference fit at only portions corresponding to the top portion of each ridge 11.

The front-side end portion of the inner column 9 is fixed to the rear-side end portion of the gear housing 13 of an electric assist device 12 supported by the vehicle body. Therefore, the inner column 9 is supported so as not to displace toward the front with respect to the vehicle body not only in the normal state but also during a secondary collision. The gear housing 13 is supported with respect to the vehicle body so as to be able to pivotally displace around a tilt shaft 14 arranged in the width direction.

The steering column 3a includes a column-side bracket 15 that is fixed to the outer column 10. The column-side bracket 15 has a U-shape and includes a pair of side plate portions 16 arranged in parallel with each other on both side portions in the width direction. The column-side bracket 15 is fixed to the outer column 10 by welding the upper-end portions of the pair of side plate portions 16 to both side portions in the width direction of the outer-circumferential surface of an intermediate portion in the axial direction of the outer column 10.

The steering column 3a is supported by the vehicle body at an intermediate portion in the axial direction via a vehicle-body-side bracket 17 and a clamp mechanism 18.

The vehicle-body-side bracket 17 includes a pair of support plate portions 19 arranged substantially parallel to each other at positions sandwiching the column-side bracket 15 from both sides in the width direction. The vehicle-body-side bracket 17 is supported so as to be detachable toward the front with respect to the vehicle body due to impact during a secondary collision.

The clamp mechanism 18 has a function of being able to switch between a locked state in which a pair of support plate portions 19 increases the force for holding the column-side bracket 15 from both sides in the width direction to prevent the column side bracket 15 from being displaced with respect to the vehicle-body-side bracket 17, and an unlocked state in which the force by which the pair of support plate portions 19 hold the column-side bracket 15 from both sides in the width direction is reduced or lost so as to allow the column side bracket 15 to displace with respect to the vehicle-body-side bracket 17. In the unlocked state, the steering column 3a pivotally displaces around the tilt shaft 14, so that the height position of the steering wheel 1 may be adjusted. On the other hand, in the locked state, the steering wheel may be held at the adjusted height position.

In the event of a collision accident, the impact load at the time of the secondary collision causes the vehicle-body-side bracket 17 to detach toward the front with respect to the vehicle body, so that the steering wheel 1, a rear-side shaft 69 of the steering shaft 2a, and the outer column 10 displace toward the front with respect to the inner column 9 and the front-side shaft 70 of the steering shaft 2a. At this time, the impact load during the secondary collision is absorbed due to the outer-circumferential surface of the inner column 9 and the inner-circumferential surface of the outer column 10 sliding in the axial direction.

In the steering device described above, the contact locations of the outer-circumferential surface of the inner column 9 with respect to the inner-circumferential surface of the outer column 10 are limited to the portions corresponding to the top portions of the ridges 11. In other words, at the time of a secondary collision, only the portions of the outer-circumferential surface of the inner column 9 corresponding to the top portions of the ridges 11 slide in the axial direction with respect to the inner-circumferential surface of the outer column 10. Therefore, the inner column 9 and the outer column 10 may be stably slid in the axial direction at the time of a secondary collision, and the absorption performance of the impact load may be stabilized.

CITATION LIST

Patent Literature

Patent Literature 1: JP 2013-136385A

SUMMARY OF INVENTION

Technical Problem

In the conventional structure illustrated in FIGS. 24 to 26, the column-side bracket 15 fixed to the outer column 10 is arranged on the outer-diameter side of the press-fitted portion of the outer column 10 where the inner column 9 is internally fitted by press-fitting. In a case of such a conventional structure, there is room for improvement as described below.

In the conventional structure illustrated in FIGS. 24 to 26, a configuration is adopted in which the impact load at the time of a secondary collision is absorbed due to the inner column 9 and the outer column 10 sliding in the axial direction, and thus from the aspect of sufficiently protecting the driver, it is important to keep the axial sliding resistance between the inner column 9 and the outer column 10, in other words, the press-fit load F of the inner column 9 with respect to the outer column 10 within an appropriate range.

In the conventional structure illustrated in FIGS. 24 to 26, the column-side bracket 15 is fixed to the outer column 10 by welding. Therefore, when the column-side bracket 15 is fixed to the outer column 10, the outer column 10 may be deformed due to residual stress generated in the peripheral portion of the welded portion of the outer column 10. In particular, in the conventional structure illustrated in FIGS. 24 to 26, the upper-end portions of the pair of side plate portions 16 of the column-side bracket 15 are welded to the outer column 10 at two weld locations that are largely separated in the circumferential direction. Therefore, the outer column 10 tends to be elliptically deformed so that the two welded portions are pulled toward both sides in the width direction due to the residual stress generated in the peripheral portion of the two welded portions.

In a case where the column-side bracket 15 fixed to the outer column 10 is located on the outer-diameter side of the press-fitted portion of the outer column 10 as in the conventional structure illustrated in FIGS. 24 to 26, the elliptical deformation as described above tends to occur in the press-fitted portion. As a result, variation in the interference fit of the fitting portion between the inner column 9 and the outer column 10 (the interference fit at the contact portions between the plurality of ridges 11 of the inner column 9 and the inner-circumferential surface of the outer column 10) becomes large.

When the variation in the interference fit of the fitting portion between the inner column 9 and the outer column 10 becomes large, the manufacturing cost may become high due to reasons such as the time required for the work of selectively combining the inner column 9 and the outer column 10 that is performed in order to keep the press-fitting load F of the inner column 9 with respect to the outer column 10 within an appropriate range becoming long or the like.

An object of the present invention is to achieve a structure in which the sliding resistance in the axial direction of the inner column and the outer column may be easily kept within an appropriate range.

Solution to Problem

The steering column of the present invention includes: a tubular outer column; a tubular inner column that is internally fitted and supported inside the outer column; and a column-side bracket that is fixed by welding to an outer-circumferential surface of the outer column.

The outer column has a press-fitted portion into which the inner column is press-fitted to an inner-diameter side.

An inner-circumferential surface of the press-fitted portion and the outer-circumferential surface of the inner column come in contact with each other with an interference fit directly or via another member at only a plurality of contact locations separated in a circumferential direction.

At least one location of the column-side bracket is welded to the outer-circumferential surface of the press-fitted portion at only two weld locations that are close in the circumferential direction.

In the steering column of the present invention, a configuration may be adopted in which the two weld locations exist within a circumferential range located between two contact locations adjacent in the circumferential direction among the plurality of contact locations at positions separated in the circumferential direction from the two contact locations.

In the steering column of the present invention, a configuration may be adopted in which the inner column has ridges that protrude toward the outside in the radial direction and extend in the axial direction at a plurality of locations separated in the circumferential direction of the outer-circumferential surface corresponding to the plurality of contact locations, and only portions of the outer-circumferential surface of the inner column corresponding to the top portions of the ridges come into contact with the inner-circumferential surface of the press-fitted portion with an interference fit.

In the steering column of the present invention, the column-side bracket may include a connecting plate portion, a pair of side plate portions that are bent in a vertical direction from both end portions in the width direction of the connecting plate portion and sandwich the outer column from both sides in the width direction, and fixing plate portions that are bent toward the inside in the width direction from both end portions in a front-rear direction of the pair of side plate portions.

A configuration may be adopted in which, of the fixing plate portions, a pair of fixing plate portions located on at least one side in the front-rear direction of the column-side bracket are welded to the outer-circumferential surface of the press-fitted portion at the two welding locations.

In the steering column of the present invention, each of the pair of side plate portions may have an offset portion in an intermediate portion in the front-rear direction of a portion on an opposite side to the connecting plate portion in the vertical direction that is offset toward the inside in the width direction with respect to a surrounding portion thereof.

In the steering column of the present invention, the connecting plate portion may have a reinforcing rib extending in the width direction.

In the steering column-side bracket of the present invention, a configuration may be adopted in which the column-side bracket is made of a metal plate, and a difference between a thickness dimension of the metal plate of the column-side bracket and a thickness dimension of the press-fitted portion is 30% or less the thickness dimension of the press-fitted portion.

The steering device of the present invention includes a steering column, a vehicle-body-side bracket, and a clamp mechanism.

The steering column includes the steering column of the present invention.

The vehicle-body-side bracket may have a pair of support plate portions that sandwich the outer column and the column-side bracket from both sides in the width direction, and a tilt adjustment elongated hole formed in each of the pair of support plate portions and extends in the vertical direction, and is able to be supported by the vehicle body.

The clamp mechanism has an adjusting rod that is inserted in the width direction through the respective tilt adjustment elongated holes of the pair of support plate portions and the column-side bracket, and a pair of pressing portions that are arranged at both side portions in the axial direction of the adjusting rod that protrudes toward the outside in the axial direction of the pair of support plate portions, and that by expanding or contracting the distance in the width direction therebetween, are able to expand or contract the distance in the width direction between the pair of support plate portions.

In the steering device of the present invention, a configuration may be adopted in which the inner column is arranged on the front side of the outer column, and is supported with respect to the vehicle in a state in which the displacement toward the front is prevented.

Effect of Invention

With the present invention, it becomes easy to keep the sliding resistance in the axial direction of the inner column and the outer column within an appropriate range.

DESCRIPTION OF EMBODIMENTS

First Example

A first example of an embodiment of the present invention will be described with reference to FIGS. 1 to 13.

Figure 1:
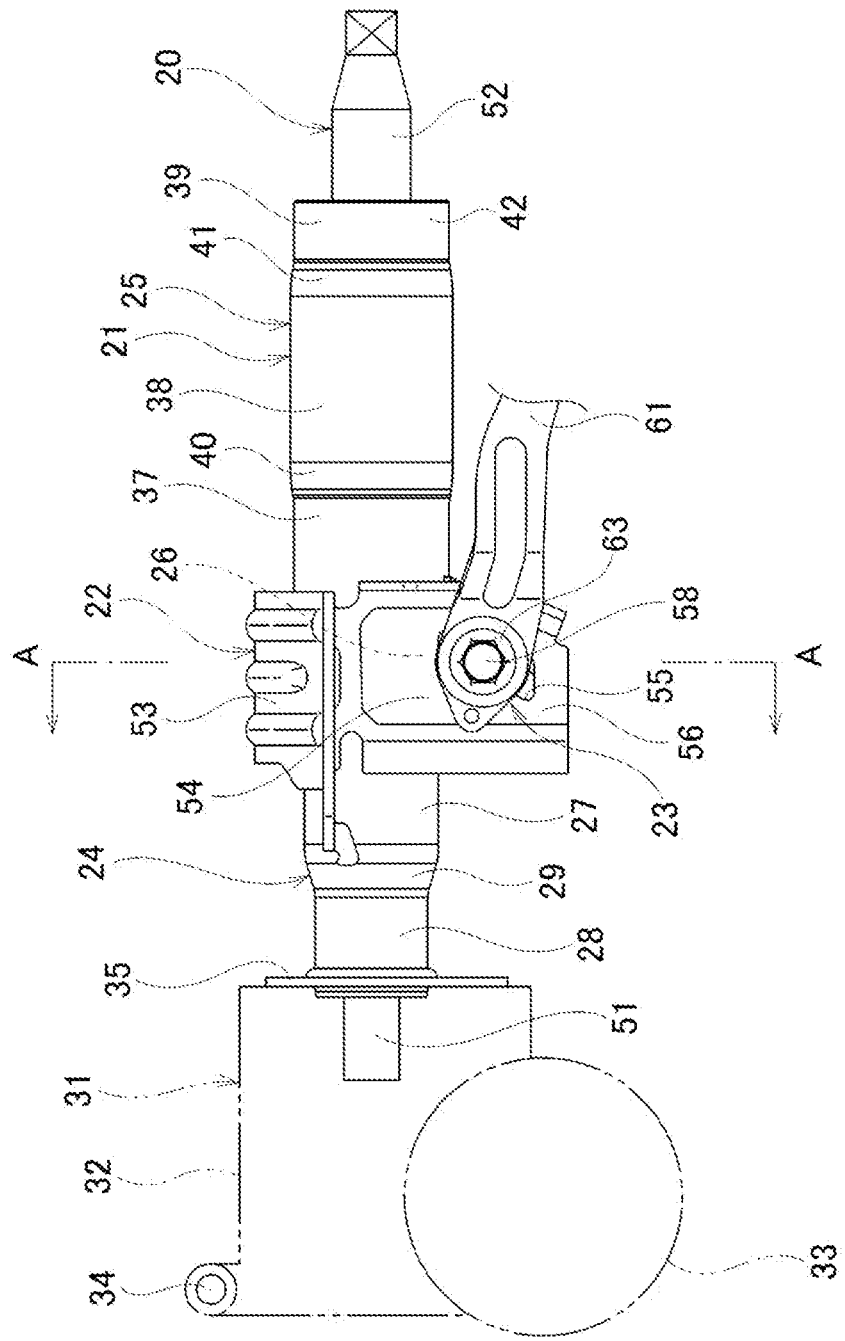
FIG. 1 is a side view of a steering device according to a first example of an embodiment of the present invention.
Figure 2:
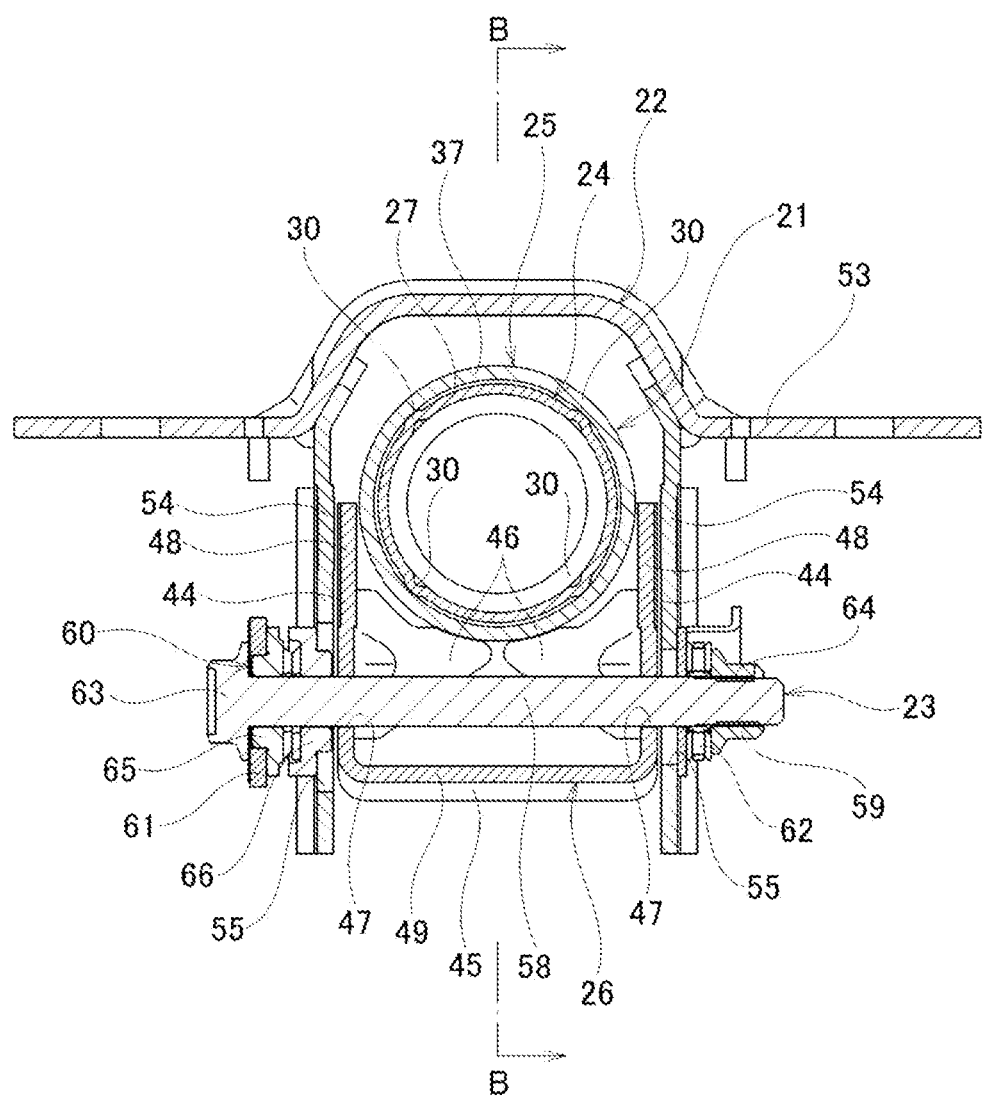
FIG. 2 is a cross-sectional view of section A-A in FIG. 1 in which a part is omitted.
Figure 3:
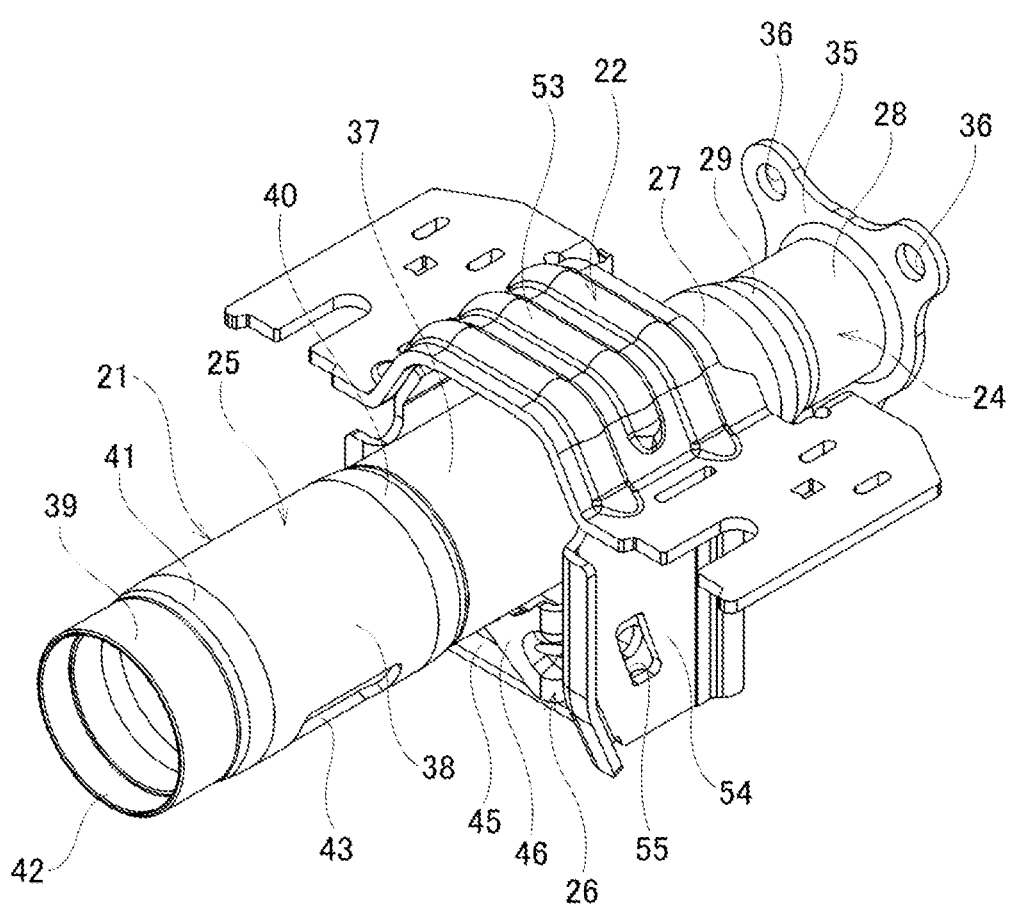
FIG. 3 is a perspective view of the steering column and the vehicle-body-side bracket of the first example as viewed from the upper side and the rear side.
Figure 4:
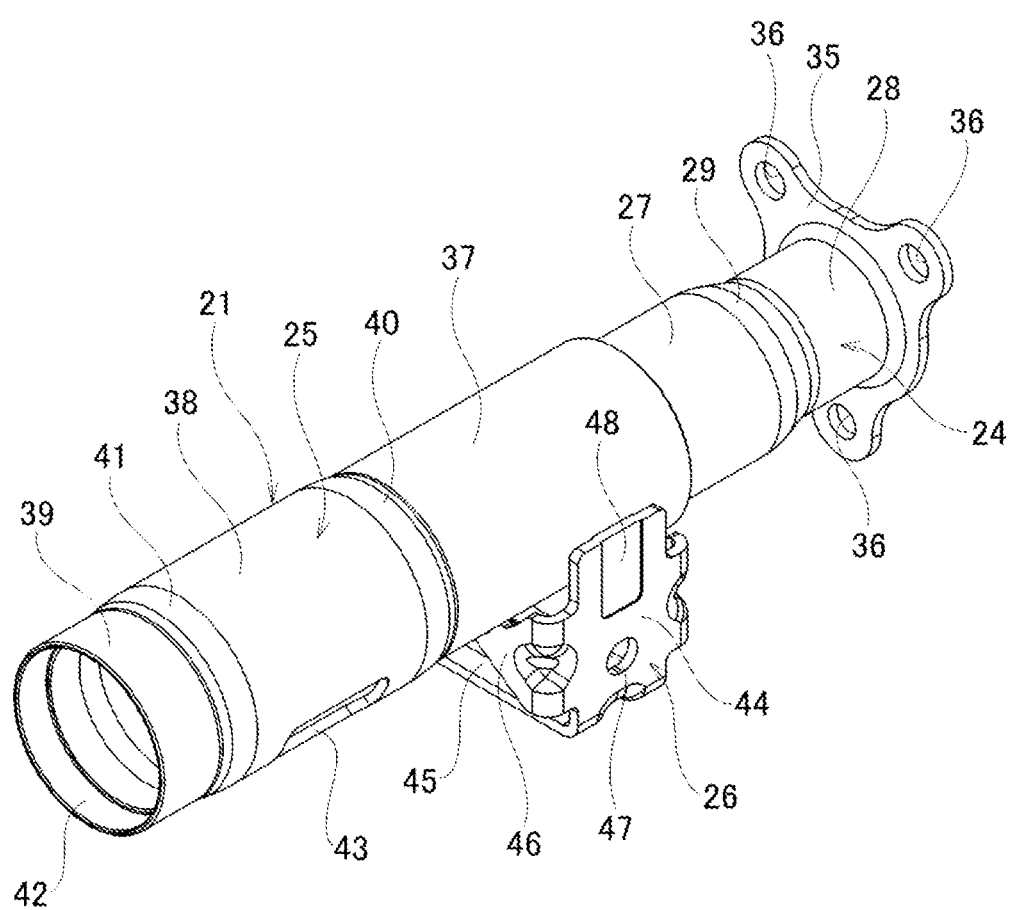
FIG. 4 is a perspective view of the steering column of the first example as viewed from the upper side and the rear side.
Figure 5:
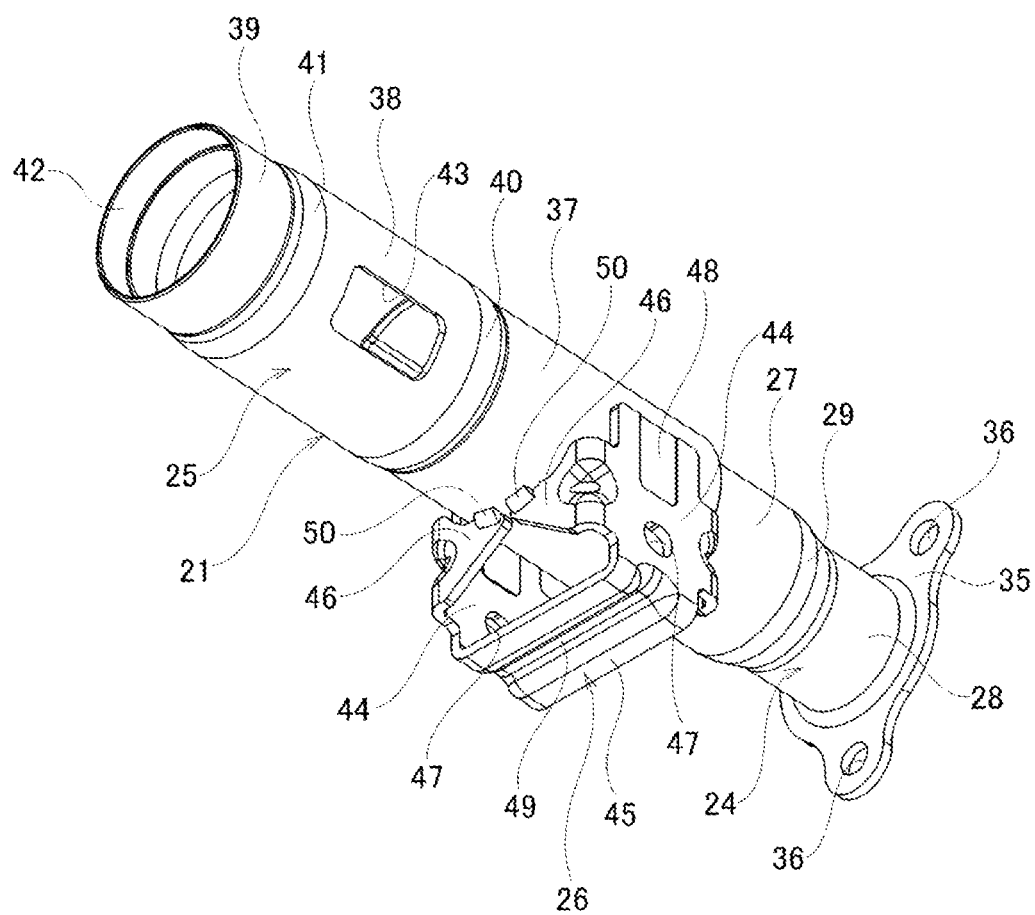
FIG. 5 is a perspective view of the steering column of the first example as viewed from the lower side and the rear side.
Figure 6:
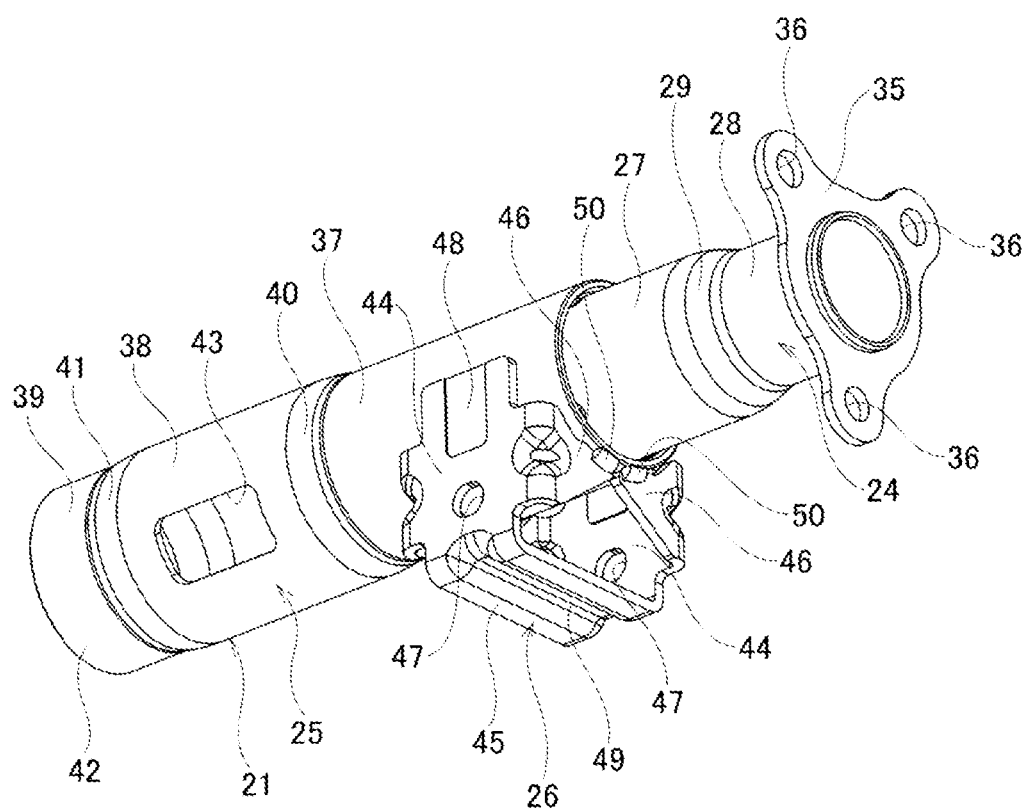
FIG. 6 is a perspective view of the steering column of the first example as viewed from the lower side and the front side.
Figure 7:
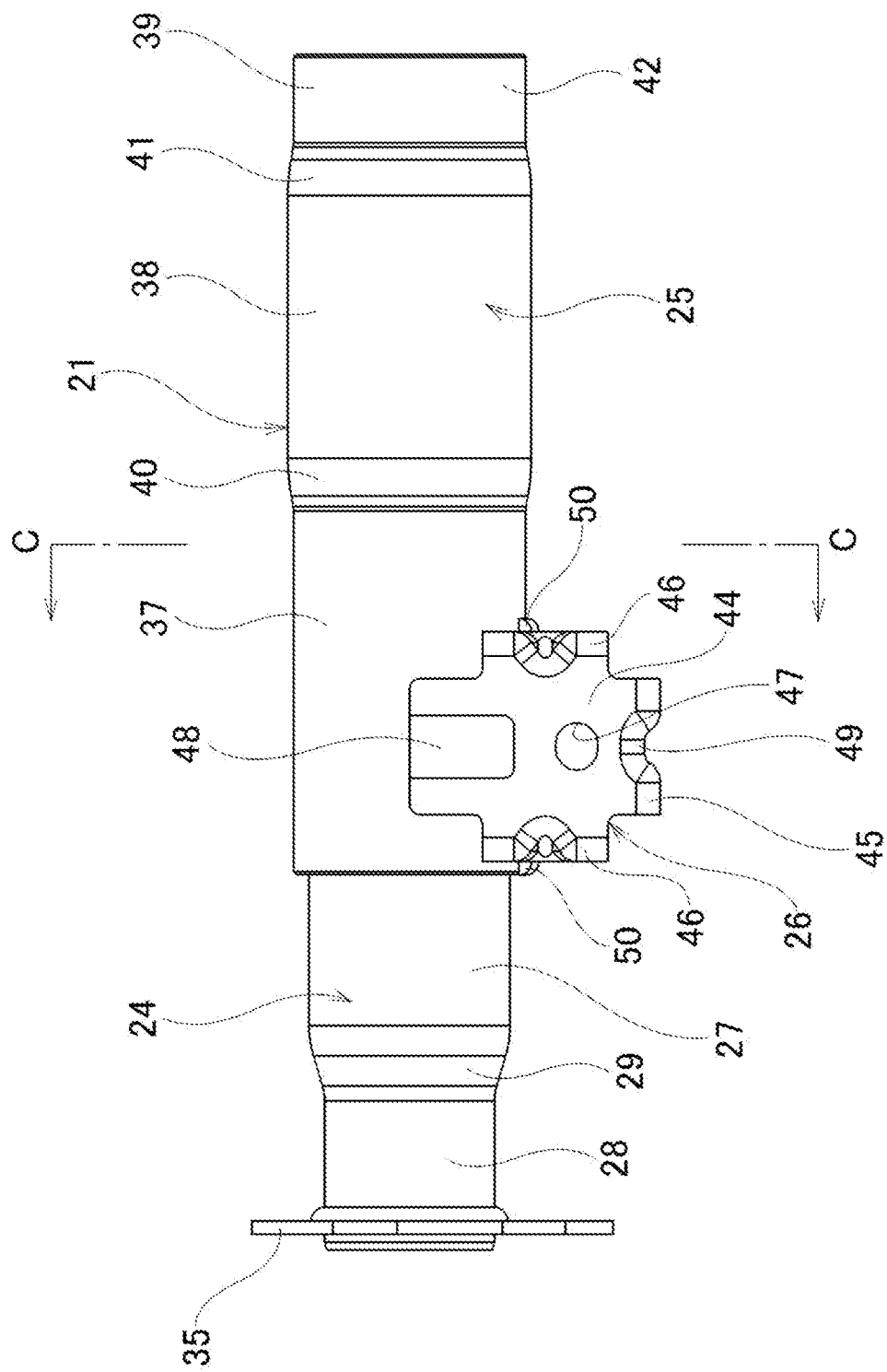
FIG. 7 is a side view of the steering column of the first example.
Figure 8:
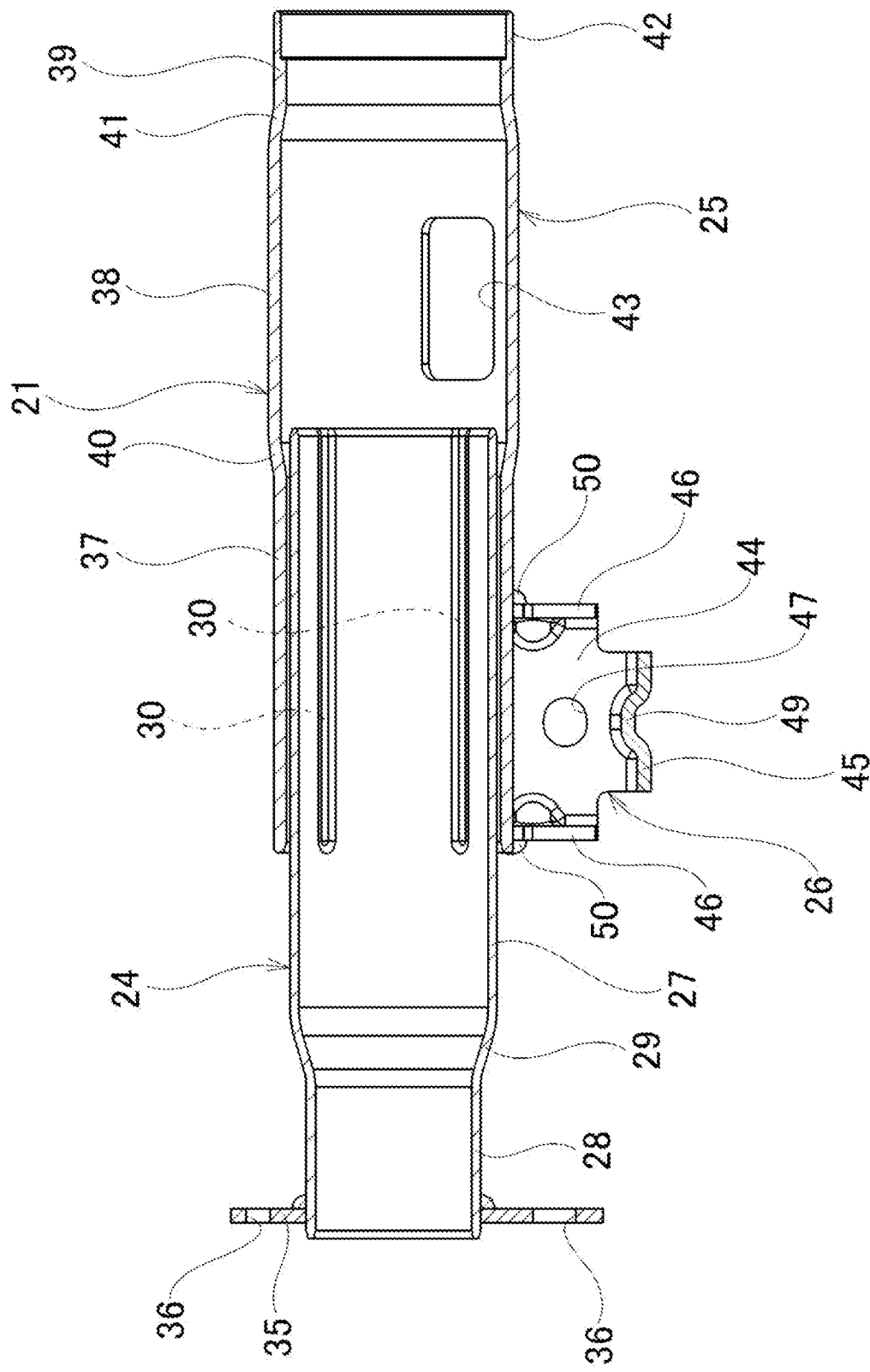
FIG. 8 is a cross-sectional view of section B-B in FIG. 2 of the steering column of the first example.

As illustrated in FIGS. 1 and 2, the steering device of this example includes a steering shaft 20, a steering column 21, a vehicle-body-side bracket 22, and a clamp mechanism 23.

Figure 23:
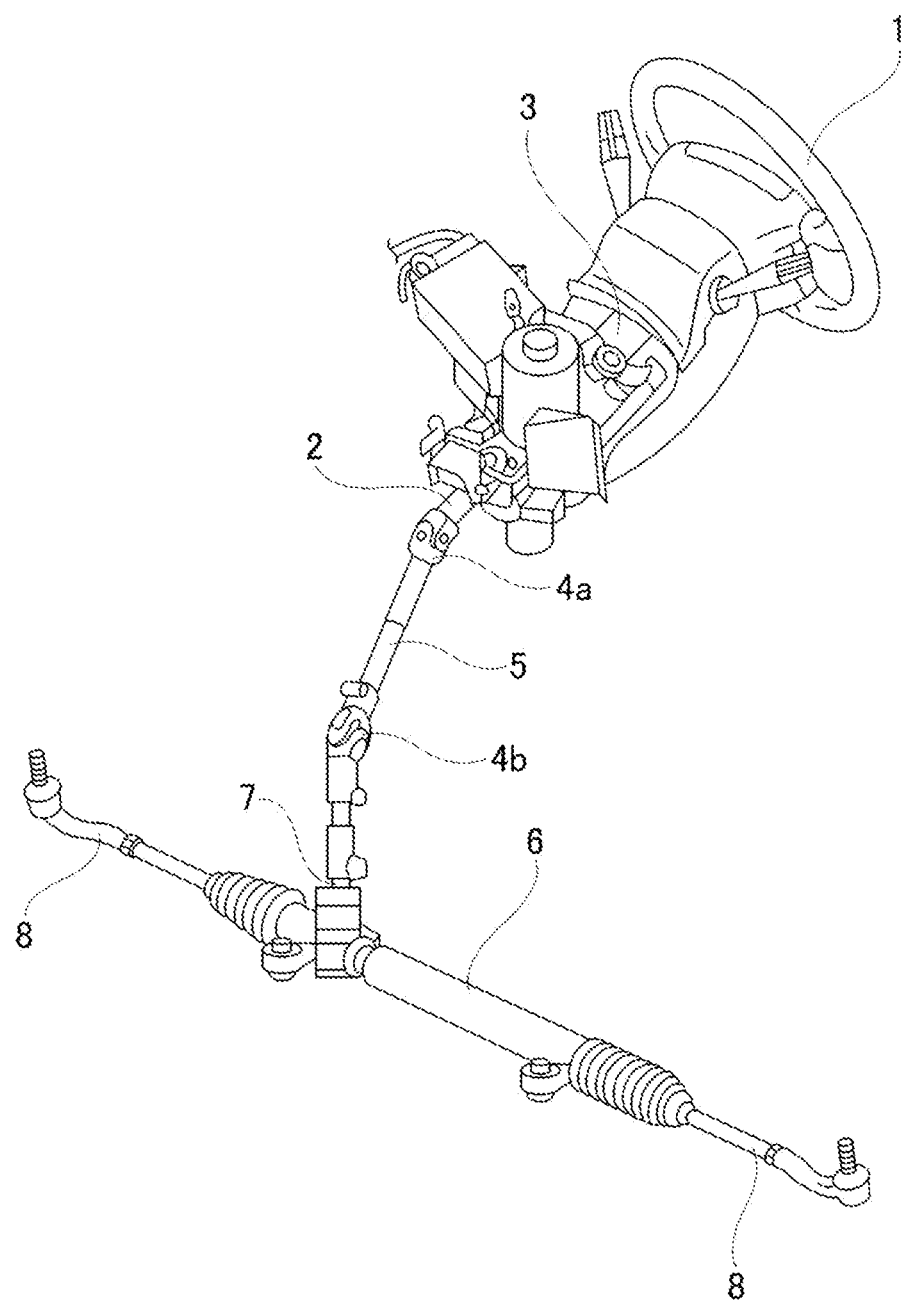
FIG. 23 is a perspective view illustrating an example of a conventional structure of a steering device.
Figure 24:
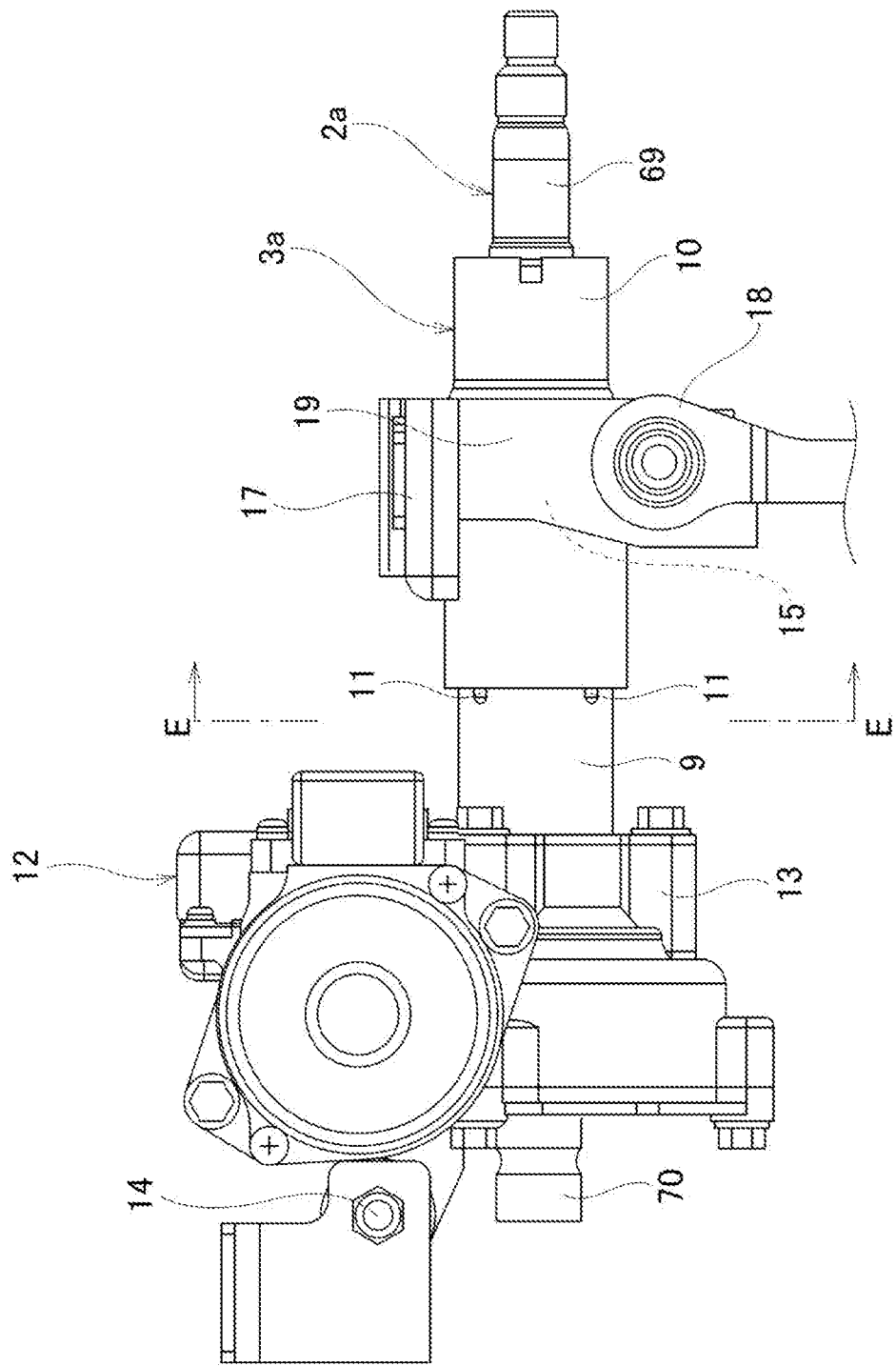
FIG. 24 is a side view illustrating an example of a more specific structure of the steering device.
Figure 25:
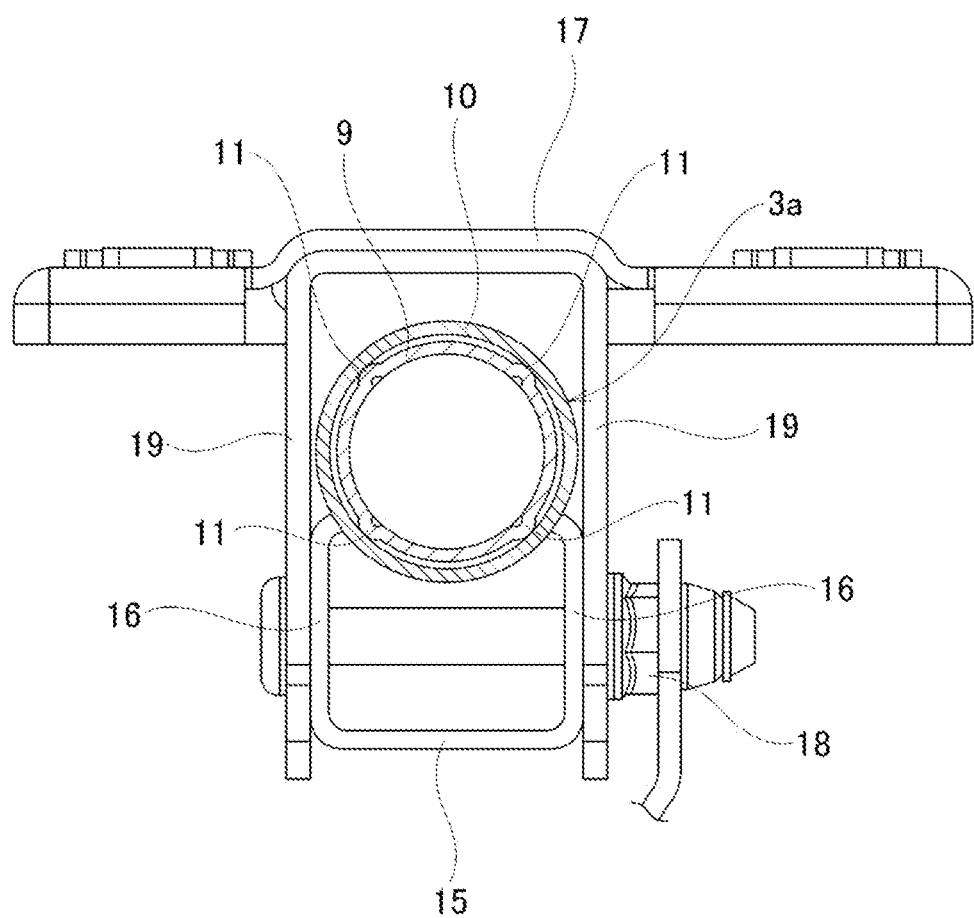
FIG. 25 is a cross-sectional view of section E-E in FIG. 24 in which a part is omitted.
Figure 26:
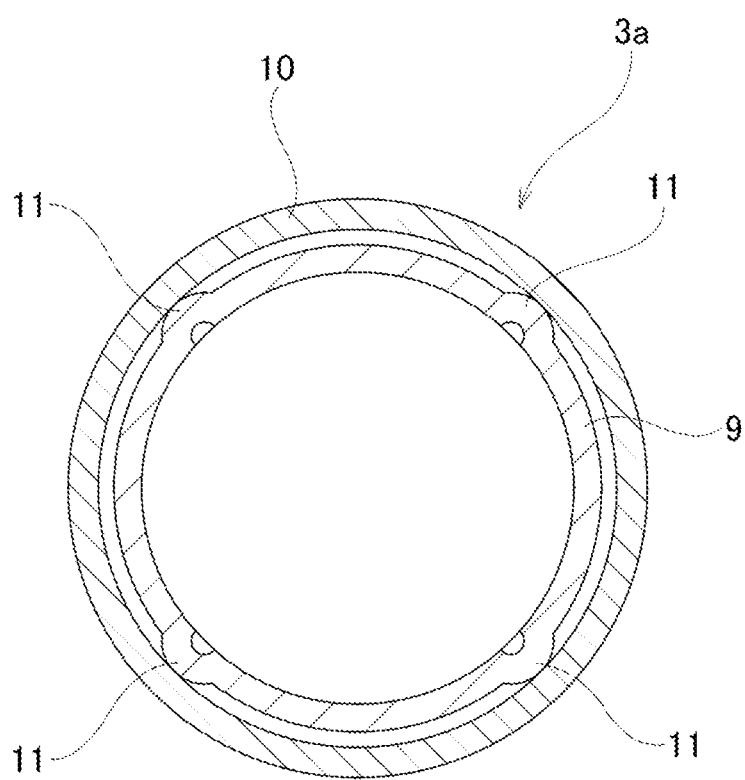
FIG. 26 is a cross-sectional view similar to FIG. 25 illustrating only the inner column and the outer column removed.

The steering shaft 20 is rotatably supported on the inner-diameter side of the tubular steering column 21. The steering wheel 1 (see FIG. 23) operated by the driver is attached to the rear-side end portion of the steering shaft 20. The vehicle-body-side bracket 22, in a state of being attached to the vehicle body, has a function of supporting an intermediate portion in the axial direction of the steering column 21 with respect to the vehicle body. The clamp mechanism 23 has a function of switching between an unlocked state that allows the steering column 21 to displace in the vertical direction with respect to the vehicle-body-side bracket 22 in order that the height position of the steering wheel 1 may be adjusted, and a locked state that prevents the steering column 21 from displacing in the vertical direction with respect to the vehicle-body-side bracket 22.

As illustrated in FIGS. 4 to 9, the steering column 21 of this example includes an inner column 24 arranged on the front side, an outer column 25 arranged on the rear side, and a column-side bracket 26 fixed to the outer column 25.

Each of the inner column 24 and the outer column 25 is a substantially cylindrical member made of metal such as steel, aluminum or the like. In this example, each of the inner column 24 and the outer column 25 is manufactured by a specified manufacturing method that includes a step of changing the inner-diameter dimension and the outer-diameter dimension of a part in the axial direction of a raw pipe such as a drawn pipe or the like as a raw material, and by subjecting the raw pipe to plastic working such as hydro-forming or drawing. In a case of implementing the present invention, each of the inner column 24 and the outer column 25 may also be manufactured by other manufacturing methods such as casting or the like. In this example, the thickness dimension of the inner column 24 is substantially constant as a whole, and the thickness dimension of the outer column 25 is substantially constant in the remaining portion excluding the rear-side end portion (bearing support portion 42). The rear-side portion of the inner column 24 is internally fitted into the front-side portion of the outer column 25 by press fitting. In other words, the rear-side portion of the inner column 24 is internally fitted in the front-side portion of the outer column 25 by an interference fit.

The inner column 24 includes a cylindrical large-diameter tubular portion 27 and a cylindrical small-diameter tubular portion 28 that is located further on the front side than the large-diameter tubular portion 27. The outer-diameter dimension of the small-diameter tubular portion 28 is smaller than the outer-diameter dimension of the large-diameter tubular portion 27. The front-side end portion of the large-diameter tubular portion 27 and the rear-side end portion of the small-diameter tubular portion 28 are connected by a conical tubular connecting portion 29 having an outer-diameter dimension that decreases going toward the front side.

The large-diameter tubular portion 27 has ridges 30 that protrude toward the outside in the radial direction and extend in the axial direction at a plurality of locations (three or more locations) separated in the circumferential direction of the outer-circumferential surface. The outside surface in the radial direction of each ridge 30 has a convex arc-shaped cross-sectional shape. In this example, the ridges 30 are arranged at four locations at equal intervals in the circumferential direction of the outer-circumferential surface of the large-diameter tubular portion 27. Each of the ridges 30 exists in a range in the axial direction in which the large-diameter tubular portion 27 is fitted to the outer column 25 in the assembled state of the steering column 21; and more specifically, exists in a continuous range in the axial direction corresponding to the rear-side end portion and intermediate portion in the axial direction of the large-diameter tubular portion 27. However, the range in the axial direction in which the ridge 30 exists may extend further to the front side than in the structure of this example, and may be a wider range in the axial direction.

In this example, each of the ridges 30 is formed by plastically deforming a part of the large-diameter tubular portion 27 toward the outside in the radial direction. Therefore, a concave groove extending in the axial direction exists on the inner-circumferential surface side of the large-diameter tubular portion 27 on the back-surface side of each of the ridges 30. As the plastic working for forming the ridges 30, for example, press working or the like may be adopted.

Figure 9:
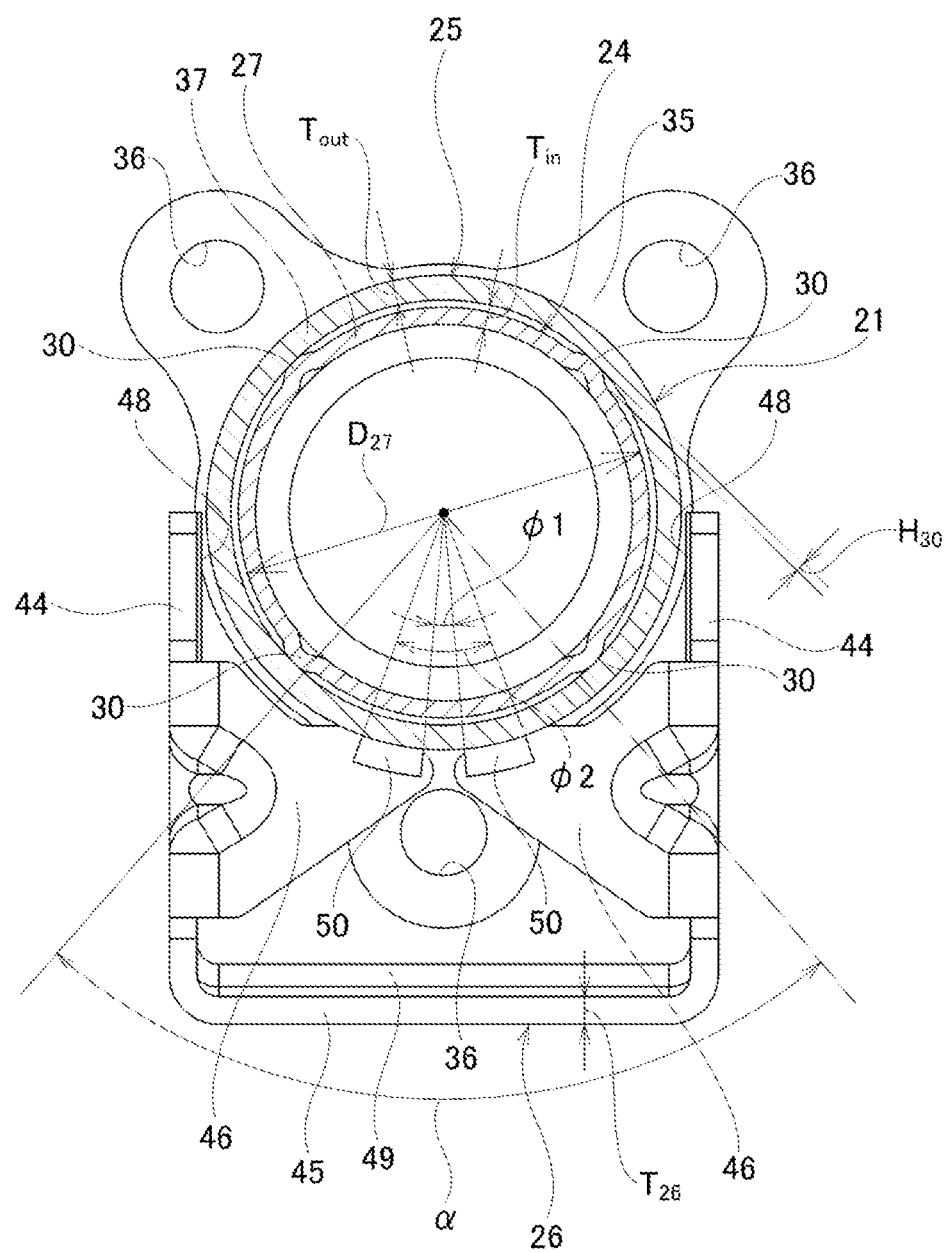
FIG. 9 is a cross-sectional view of section C-C in FIG. 7.
Figure 10:
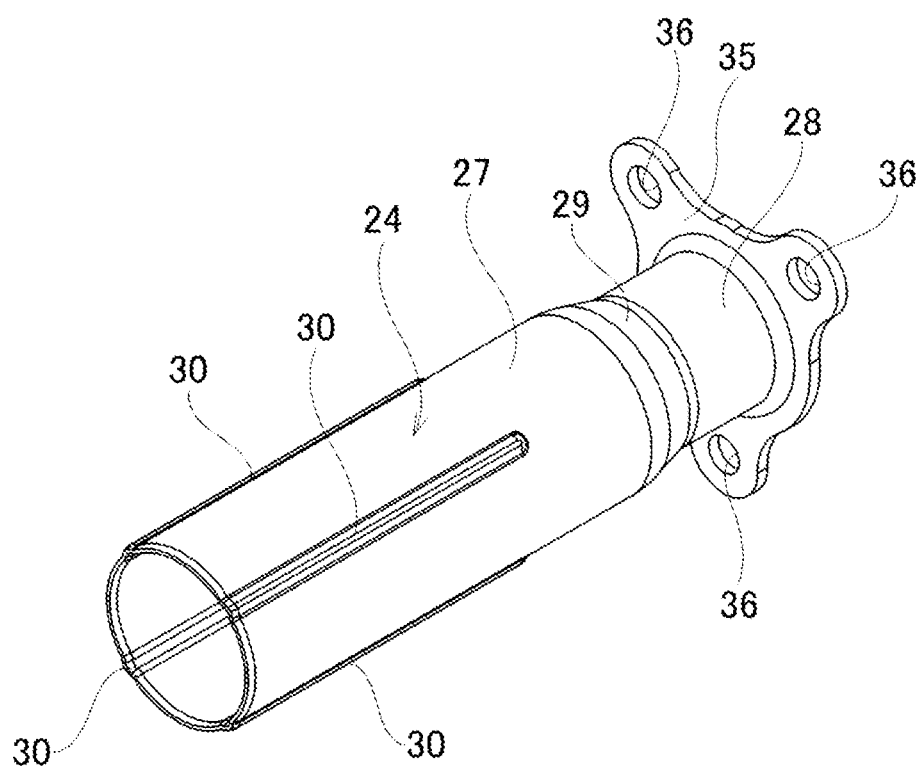
FIG. 10 is a perspective view of the inner column of the first example as viewed from the upper side and the rear side.
Figure 11:
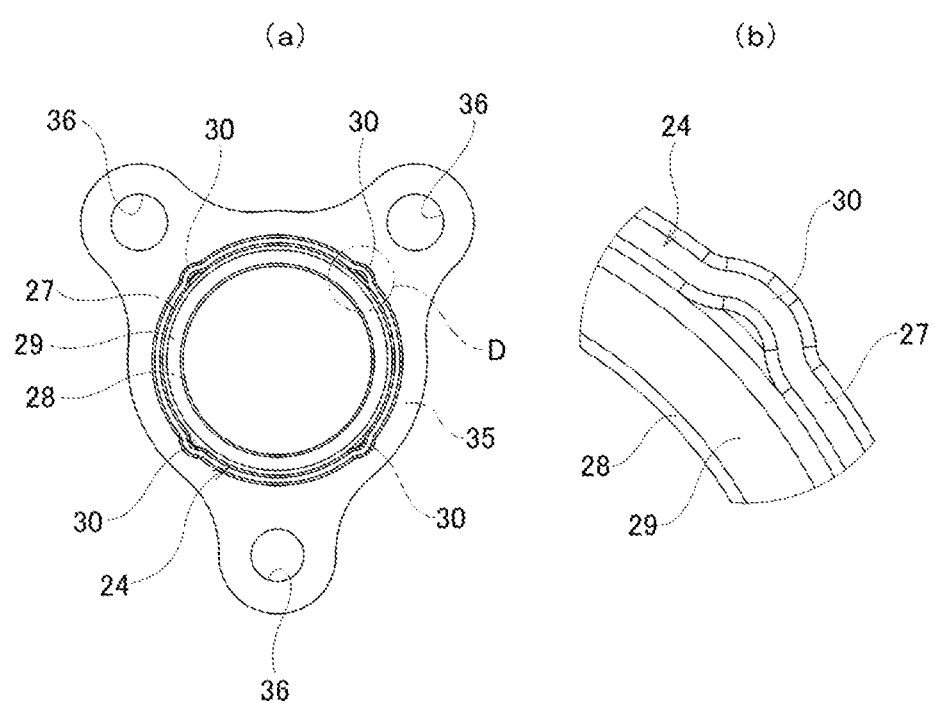
FIG. 11A is a view of the inner column and a mounting plate of the first example as viewed from the rear side.
FIG. 11B is an enlarged view of portion D in FIG. 11A.

In this example, the height in the radial dimension $H_{30}$ of each ridge 30 is set to 0.5% or more and 7% or less the outer-diameter dimension $D_{27}$ of the location on the outer-circumferential surface of the large-diameter tubular portion 27 separated from the ridges 30 (FIG. 9). For example, in a case where the outer-diameter dimension $D_{27}$ of the location of the outer-circumferential surface of the large-diameter tubular portion 27 separated from the ridges 30 is 38.5 mm, the radial height dimension $H_{30}$ of the ridge 30 is set to 0.5 mm to 1.0 mm.

The inner column 24 is supported so as not to displace toward the front with respect to the vehicle body not only in the normal state but also during a secondary collision. Therefore, the front-side end portion of the inner column 24 is connected and fixed to the rear-side end portion of a gear housing 32 of an electric assist device 31 supported by the vehicle body. The electric assist device 31 applies auxiliary power generated by an electric motor 33 as a power source to the steering force transmission path from the steering wheel 1 to the steered wheels to reduce the force required for the driver to operate the steering wheel 1. In this example, in order to enable adjustment of the height position of the steering wheel 1, the gear housing 32 is supported with respect to the vehicle body so as to be able to pivotally displace around the tilt shaft 34.

In this example, the steering column 21 further includes a mounting plate 35 for connecting and fixing the front-side end portion of the inner column 24 to the rear-side end portion of the gear housing 32. The mounting plate 35 is an annular flat plate member, and is externally fitted and fixed to the front-side end portion of the small-diameter tubular portion 28 of the inner column 24. The mounting plate 35 has mounting holes 36 at a plurality of locations (three locations in the illustrated example) separated in the circumferential direction. On the other hand, the gear housing 32 has screw holes (not illustrated) at locations on the rear-side end portion that are aligned with the mounting holes 36 of the mounting plate 35. The front-side end portion of the inner column 24 is connected and fastened to the rear-side end portion of the gear housing 32 by inserting bolts (not illustrated) from the rear side through the mounting holes 36 of the mounting plate 35 and screwing the bolts into the screw holes in the gear housing 32.

In this example, in a state where the front-side end portion of the inner column 24 is connected and fixed to the rear-side end portion of the gear housing 32, the phase of the arrangement in the circumferential direction of the mounting holes 36 provided in the mounting plate 35 in the circumferential direction is regulated so that the positions in the circumferential direction of the plurality of ridges 30 with respect to the gear housing 32, or in other words, the positions in the circumferential direction of the plurality of ridges 30 in the used state are uniquely determined. More specifically, the mounting holes 36 are arranged at irregular intervals in the circumferential direction.

In this example, as illustrated in FIGS. 2 and 9, the positions in the circumferential direction of the plurality of ridges 30 in the used state include positions at a total of four locations, such that positions at two locations are respectively shifted 45° toward both sides in the circumferential from the upper-end portion, and positions at two locations are respectively shifted 45° toward both sides in the circumferential from the bottom-end portion.

The outer column 25 includes a cylindrical front-side small-diameter tubular portion 37, a cylindrical large-diameter tubular portion 38 located further on the rear side than the front-side small-diameter tubular portion 37, and a rear-side small-diameter tubular portion 39 located further on the rear side than the large-diameter tubular portion 38. The inner-diameter dimension of the large-diameter tubular portion 38 is larger than the inner-diameter dimension of both the front-side small-diameter tubular portion 37 and the rear-side small-diameter tubular portion 39. The front-side end portion of the large-diameter tubular portion 38 and the rear-side end portion of the front-side small-diameter tubular portion 37 are connected by a conical tubular front-side connecting portion 40 having an inner-diameter dimension that decreases going toward the front side. The rear-side end portion of the large-diameter tubular portion 38 and the front-side end portion of the rear-side small-diameter tubular portion 39 are connected by a conical tubular rear-side connecting portion 41 having an inner-diameter dimension that decreases going toward the rear side.

The rear-side small-diameter tubular portion 39 has a bearing support portion 42 in the rear-side half portion. The bearing support portion 42 is a portion in which a rolling bearing (not illustrated) internally fitted and supported in order to rotatably support the steering shaft 20 (rear-side shaft 52) on the inner-diameter side of the outer column 25. The inner-diameter dimension of the bearing support portion 42 is larger than the inner-diameter dimension of the front-side half portion of the rear-side small-diameter tubular portion 39. Therefore, the thickness dimension of the bearing support portion 42 is smaller than the thickness dimension of the front-side half portion of the rear-side small-diameter tubular portion 39.

The large-diameter tubular portion 38 has a key lock hole 43 for inserting a lock pin of a steering lock mechanism at one location in the circumferential direction of an intermediate portion in the axial direction.

The front-side small-diameter tubular portion 37 is a press-fitting portion into which the rear-side portion of the inner column 24 is internally fitted by press-fitting. In other words, in this example, the intermediate portion and the rear-side portion in the axial direction of the large-diameter tubular portion 27 that is the rear-side portion of the inner column 24 is internally fitted by press-fitting in the front-side small-diameter tubular portion 37 that is the front-side portion of the outer column 25. In this state, the outer-circumferential surface of the large-diameter tubular portion 27 is such that only the portions of the top portions of the ridges 30 come in contact with the inner-circumferential surface of the front-side small-diameter tubular portion 37 with an interference fit. In this example, the front-side small-diameter tubular portion 37 is composed of a part of the raw pipe that is the raw material of the outer column 25.

The column-side bracket 26 is fastened to the outer column 25 in a state in which the column-side bracket 26 is arranged on the outer-diameter side (lower side) of the front-side portion of the front-side small-diameter tubular portion 37, which is a portion of the outer column 25 to which the large-diameter tubular portion 27 of the inner column 24 is internally fitted by press-fitting.

The column-side bracket 26 is made by pressing a metal plate such as steel or the like, and includes a pair of side plate portions 44, a connecting plate portion 45, and two fixing plate portions 46 for each of the side plate portions 44. The pair of side plate portions 44 are separated from each other in the width direction and arranged in parallel with each other. The connecting plate portion 45 connects the lower end portions of the pair of side plate portions 44 to each other by connecting both end portions in the width direction to the lower end portions of the pair of side plate portions 44. In other words, the pair of side plate portions 44 are arranged so as to bend at right angles toward the upper side from both end portions in the width direction of the connecting plate portions 45. The fixing plate portions 46 are arranged so as to be bent at right angles toward the inside in the width direction from an intermediate portion in the vertical direction of both ends in the front-rear direction of the side plate portions 44. The tip edge portions of the pair of fixing plate portions 46 arranged so as to bend at right angles toward the inside in the width direction from the front-side end portions of the side plate portions 44 are close to each other in the width direction. Moreover, the tip edge portions of the pair of fixing plate portions 46 arranged so as to bend at right angles toward the inside in the width direction from the rear-side end portions of the side plate portions 44 are close to each other in the width direction. In this example, the fixing plate portion 46 is configured by two pairs of fixing plate portions 46 arranged apart from each other in the front-rear direction.

Each of the side plate portions 44 has a circular through hole 47 in the lower-side portion, and the through holes 47 are aligned with each other in the width direction. Each of the side plate portions 44 has an offset portion 48 in the middle portion in the front-rear direction of the upper-side portion. The offset portion 48 has a rectangular flat plate shape and is offset toward the inside in the width direction with respect to the surrounding portion. Due to the presence of the offset portion 48, the rigidity of the side plate portion 44 is increased.

The connecting plate portion 45 has a reinforcing rib 49. The reinforcing rib 49 is formed in the middle portion in the front-rear direction of the connecting plate portion 45 over the entire length in the width direction so as to extend in the width direction. The reinforcing rib 49 has an arc-shaped cross-sectional shape with a convex upper side and a concave lower side. The rigidity of the connecting plate portion 45 is increased by the presence of the reinforcing rib 49.

Each of the fixing plate portions 46 has a substantially triangular shape in which the width dimension in the vertical direction becomes smaller going toward the inner side in the width direction, which is the tip-end side. The edge portion on the upper end of each tip-end portion of the fixing plate portion 46 has an arc shape along the outer-circumferential surface of the front-side small-diameter tubular portion 37 of the outer column 25 (see FIG. 13).

The column-side bracket 26 is fixed to the lower-side portion of the front-side portion of the front-side small-diameter tubular portion 37 of the outer column 25 by welding. In this example, in order to reduce the amount of deformation of the front-side small-diameter tubular portion 37 caused by welding, the welding location of the column-side bracket 26 with respect to the front side small diameter cylinder portion 37 is devised.

In other words, only the edge portions on the upper ends of the tip-end portions of the fixing plate portions 46 of the column-side bracket 26 are welded to the lower surface of the front-side small-diameter tubular portion 37 of the outer column 25 by weld bead portions 50.

In this example, there are two weld bead portions 50 for fixing the column-side bracket 26 to the outer column 25 on each of both sides in the front-rear direction of the column side bracket 26. On each of both sides in the front-rear direction of the column-side bracket 26, the two weld bead portions 50 are located symmetrically on both sides in the circumferential direction that sandwich the lower-end portion of the outer column 25, and are close to each other in the circumferential direction. The space in the circumferential direction between these two weld bead portions 50 is 15° or less (preferably 5° or less) when represented by a center angle φ1 (see FIG. 9) centered on the center axis of the outer column 25. In this example, the circumferential range in which these two weld bead portions 50 exist is 30° or less (preferably, 25° or less) when represented by a center angle φ2 (see FIG. 9) centered on the center axis of the outer column 25.

In this example, the two weld bead portions 50 are arranged close to each other in the circumferential direction on each of both sides of the column-side bracket 26 in the front-rear direction. In other words, of the front-side small-diameter tubular portion 37 of the outer column 25, two locations (locations where the weld bead portions 50 exist) close to each other in the circumferential direction are weld locations. Therefore, even in a case where the front-side small-diameter cylinder portion 37 is deformed such that the two locations are pulled to both sides in the width direction due to residual stress generated in the surrounding portions of the two locations after welding, it is difficult for elliptical deformation to occur in the front-side small-diameter tubular portion 37. In this example, the two welding points are close to each other in the circumferential direction, and thus the deformation of the front-side small-diameter tubular portion 37 after welding is mostly the same as in a case where there is only one welding location in the circumferential direction.

Therefore, the amount of deformation of the front-side small-diameter tubular portion 37 after welding may be reduced.

In this example, on each of both sides in the front-rear direction of the column-side bracket 26, the two weld bead portions 50 exist in a circumferential range a (see FIG. 9) located at positions between two contact portions of the contact portions between the inner-circumferential surface of the front-side small-diameter tubular portion 37 of the outer column 25 and the plurality of ridges 30 of the inner column 24 that are adjacent in the circumferential direction on the lower half portion of the steering column 21, and that are separated in the circumferential direction from the two contact portions. Therefore, it is possible to prevent or suppress the local deformation that occurs around the welded portion of the front-side small-diameter tubular portion 37 from extending to the portions of the inner-circumferential surface of the front-side small-diameter tubular portion 37 where the ridges 30 come in contact.

In this example, when the outer column 25 and the column side bracket 26 are welded and joined by the weld bead portions 50, in order to be able to adjust the positional relation between the outer column 25 and the column-side bracket 26 (in particular, the vertical relationship, for example, the vertical distance from the outer column 25 to the center axis of the pair of through holes 47 of the column side bracket 26, or the like) as desired, a minute gap is provided as an adjustment allowance between the edge portion of the top end of the tip-end portion of the fixing plate portions 46 and the outer-circumferential surface of the front-side small-diameter tubular portion 37. Therefore, in a case where the rigidity in the radial direction of the column-side bracket 26 is higher than the rigidity in the radial direction of the front-side small-diameter tubular portion 37, the front-side small-diameter tubular portion 37 tends to be attracted to the column-side bracket 26 based on the existence of the minute gap at the time of welding joining by the welding bead portions 50, and the amount of deformation of the front-side small-diameter tubular portion 37 increases.

In this example, in order to reduce the amount of deformation of the front-side small-diameter tubular portion 37 for such a reason, or more specifically, in order to reduce the difference between the rigidity of the column side bracket 26 and the rigidity in the radial direction of the front-side small-diameter tubular portion 37, the thickness dimension $T_{26}$ of the metal plate of the column-side bracket 26 and the thickness dimension $T_{out}$ of the front-side small-diameter tubular portion 37 are made to be substantially equal to each other. More specifically, the difference between the thickness dimension of the metal plate of the column-side bracket 26 and the thickness dimension of the front-side small-diameter tubular portion 37 is made to be 30% or less (preferably, 15% or less) the thickness dimension of the front-side small-diameter tubular portion 37.

With the column-side bracket 26 fixed to the outer column 25, the upper-side portions of the pair of side plate portions 44 are arranged at positions that sandwich the front-side small-diameter tubular portion 37 of the outer column 25 from both sides in the width direction. In this example, the upper-end portions of the pair of side plate portions 44 are not welded to both side portions in the width direction of the front-side small-diameter tubular portion 37 of the outer column 25. In this example, when welding and joining the outer column 25 and the column-side brackets 26 by the weld bead portions 50, in order that the positional relation between the outer column 25 and the column-side bracket 26 (particularly, the positional relation in the width direction) can be adjusted as desired, and in order to prevent the distance between the upper-side portions of the pair of side plate portions 44 from being expanded in the width direction by the front-side small-diameter tubular portion 37 (to prevent the pair of side plate portions 44 from tilting), a minute gap as an adjustment allowance is provided between each upper-side portion of the pair of side plate portions 44 and both side portions in the width direction of the front-side small-diameter tubular portion 37 of the outer column 25 in a state of the steering column 21 alone.

As illustrated in FIG. 1, the steering shaft 20 includes a front-side shaft 51 arranged on the front side and a rear-side shaft 52 arranged on the rear side. The front-side shaft 51 and the rear-side shaft 52 are spline-fitted to enable torque transmission and relative displacement in the axial direction.

The rear-side shaft 52 is supported by a rolling bearing (not illustrated) that is internally fitted in and supported by the bearing support portion 42 so as to only be able to rotate with respect to the outer column 25. A key lock collar (not illustrated) of the steering lock mechanism is externally fitted and fixed to a location on the rear-side shaft 52 aligned in the axial direction with the key lock hole 43 of the outer column 25. The rear-side end portion of the rear-side shaft 52 projects in the axial direction from the inner-diameter side of the outer column 25. The steering wheel 1 is attached to the rear-side end portion of the rear-side shaft 52.

The front-side shaft 51 is supported by a rolling bearing (not illustrated) so as to only be able to rotate with respect to the inner column 24 and the gear housing 32. The front-side end portion of the front-side shaft 51 projects in the axial direction from the inner-diameter side of the inner column 24, and is inserted inside the gear housing 32.

The vehicle-body-side bracket 22 is made of metal such as steel or the like, and includes a mounting plate portion 53 and a pair of support plate portions 54. The mounting plate portion 53 forms the upper-side portion of the vehicle-body-side bracket 22, and is arranged in the width direction. The mounting plate portion 53 is supported by the vehicle body so as to be detachable toward the front by the impact at the time of a secondary collision. The pair of support plate portions 54 are arranged substantially parallel to each other at positions sandwiching the column-side bracket 26 from both sides in the width direction. The upper-end portion of each of the support plate portions 54 is joined and fixed to an intermediate portion in the width direction of the mounting plate portion 53. Each of the support plate portions 54 has a tilt adjustment elongated hole 55 extending in the vertical direction at positions that are aligned with each other in the width direction and aligned with the through holes 47 of the column-side bracket 26. Each of the tilt adjustment elongated holes 55 has an arc shape centered on the tilt shaft 34.

Figure 12:
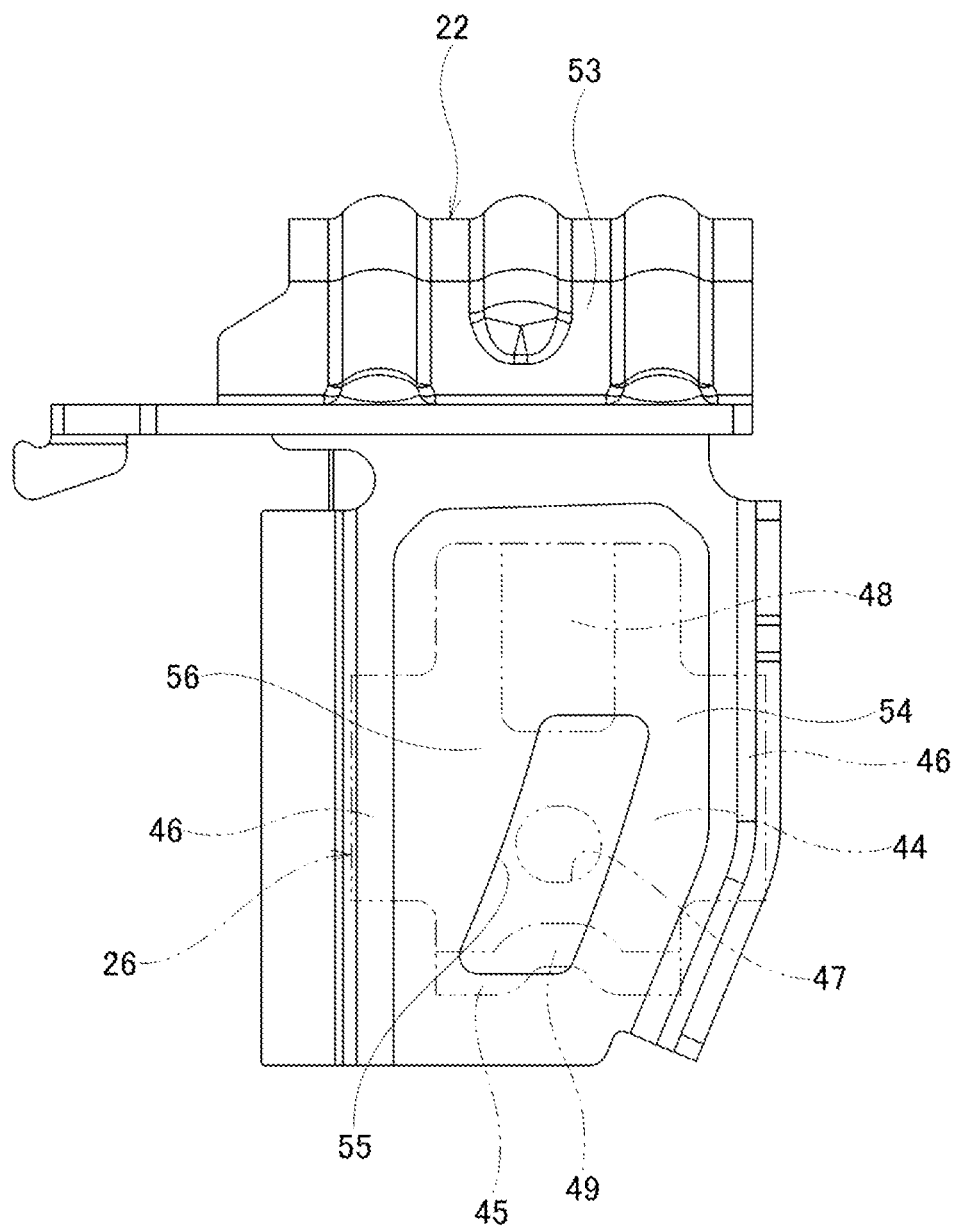
FIG. 12 is a side view of the vehicle-body-side bracket of the first example.
Figure 13:
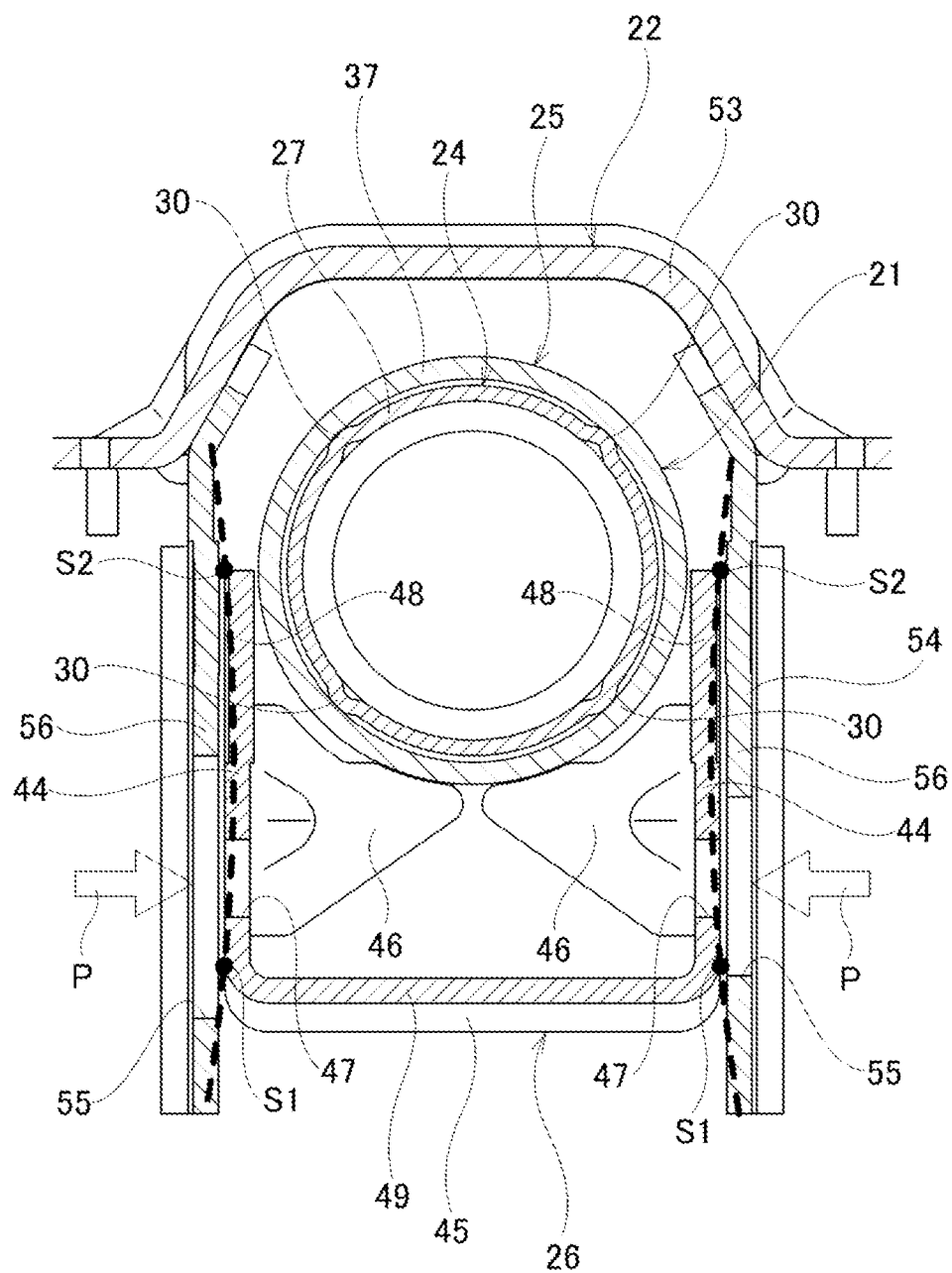
FIG. 13 is a partially enlarged view of FIG. 2 in which a part is omitted.
Figure 14:
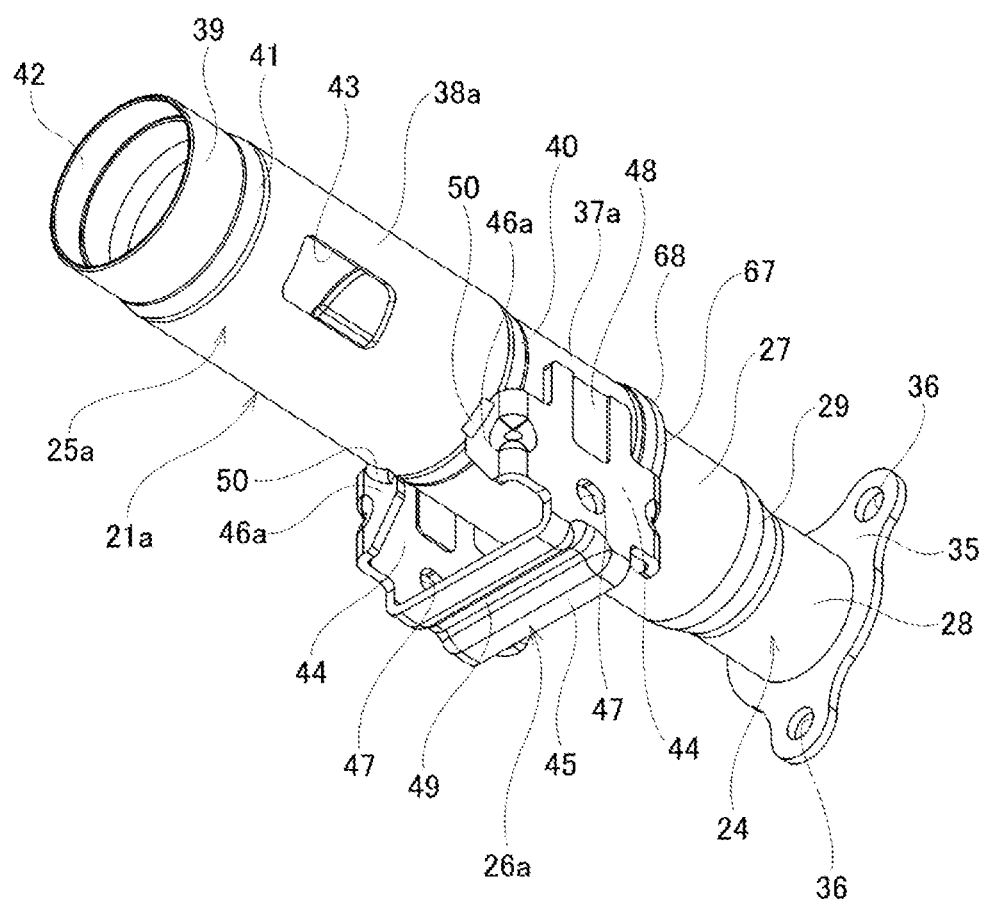
FIG. 14 is a perspective view of the steering column of a first reference example related to the present invention as viewed from the lower side and the rear side.
Figure 15:
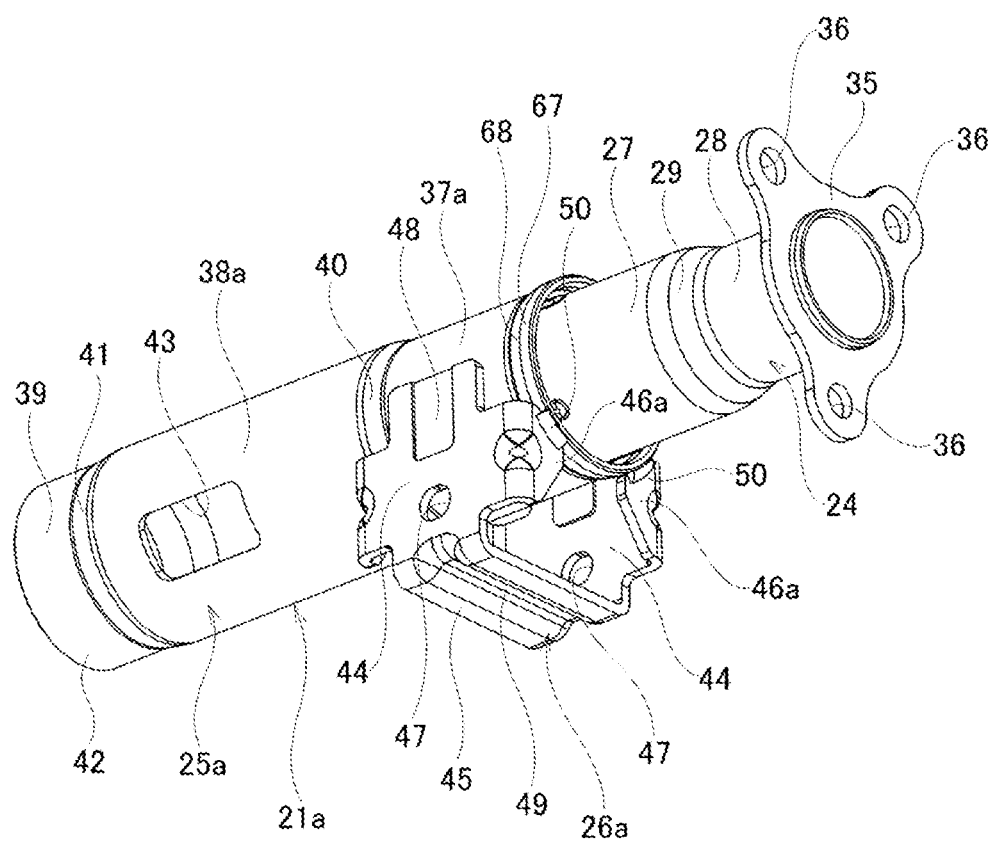
FIG. 15 is a perspective view of the steering column illustrated in FIG. 14 as viewed from the lower side and the front side.
Figure 16:
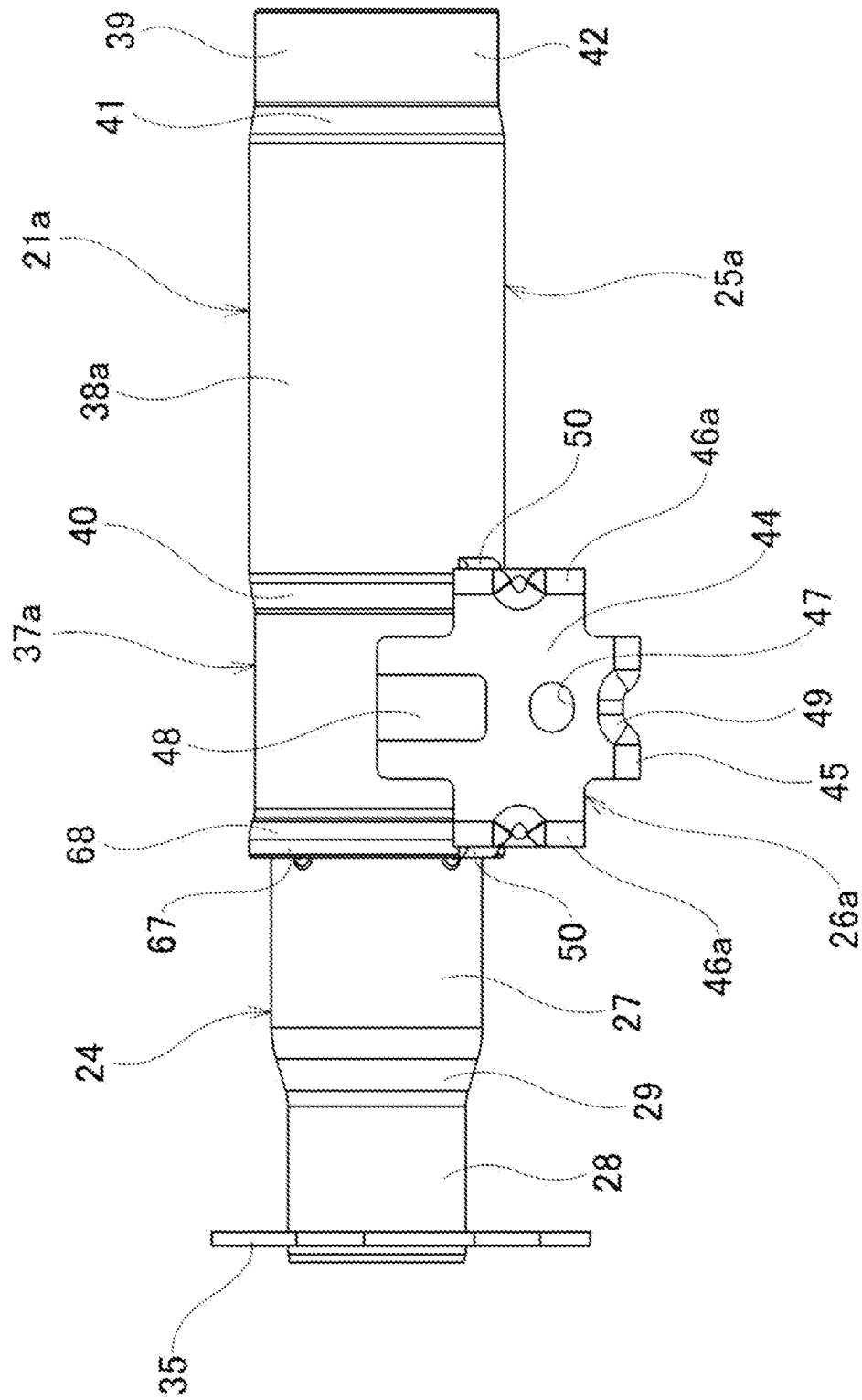
FIG. 16 is a side view of the steering column illustrated in FIG. 14.
Figure 17:
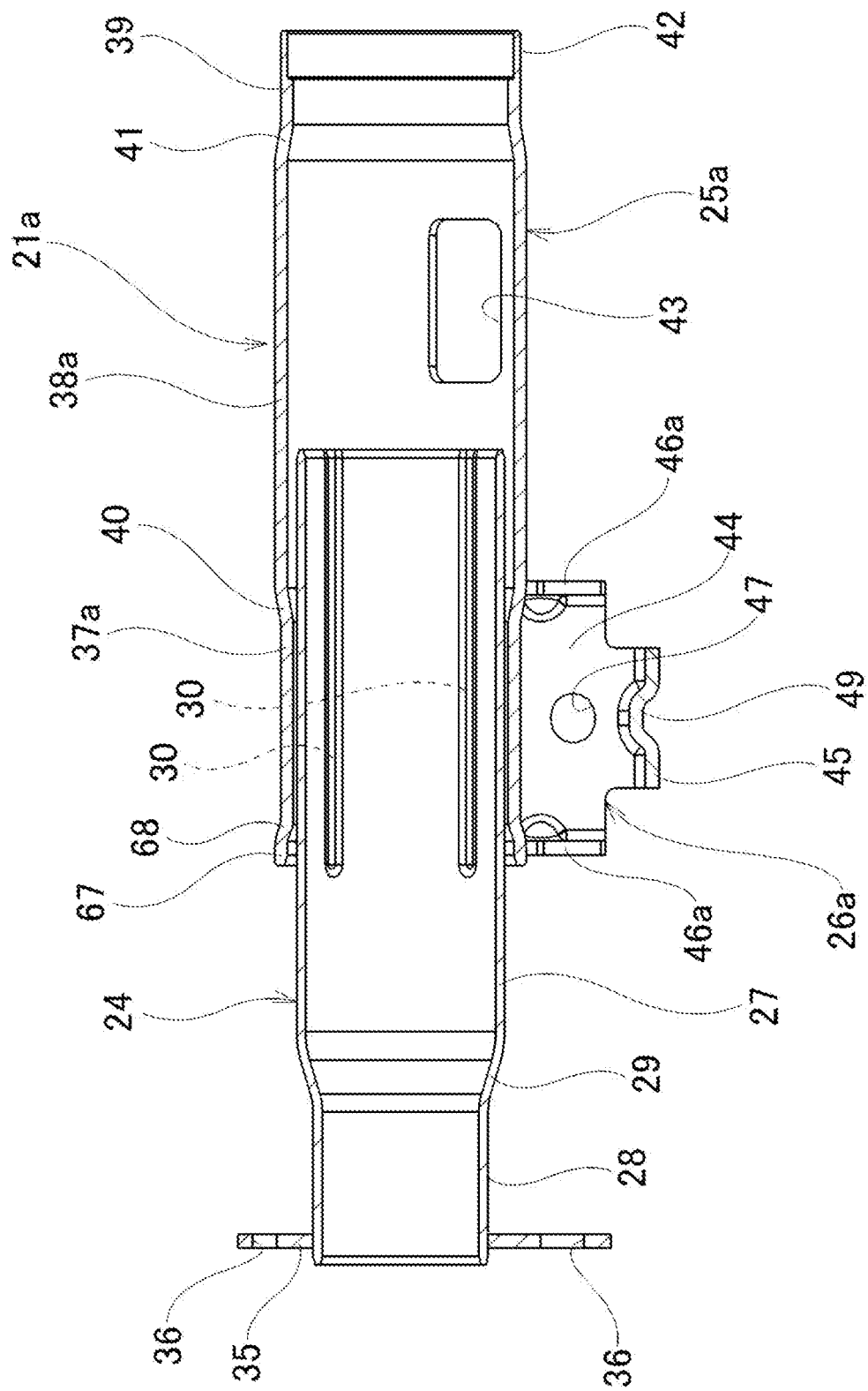
FIG. 17 is a view corresponding to section B-B in FIG. 2 of the steering column illustrated in FIG. 14.
Figure 18:
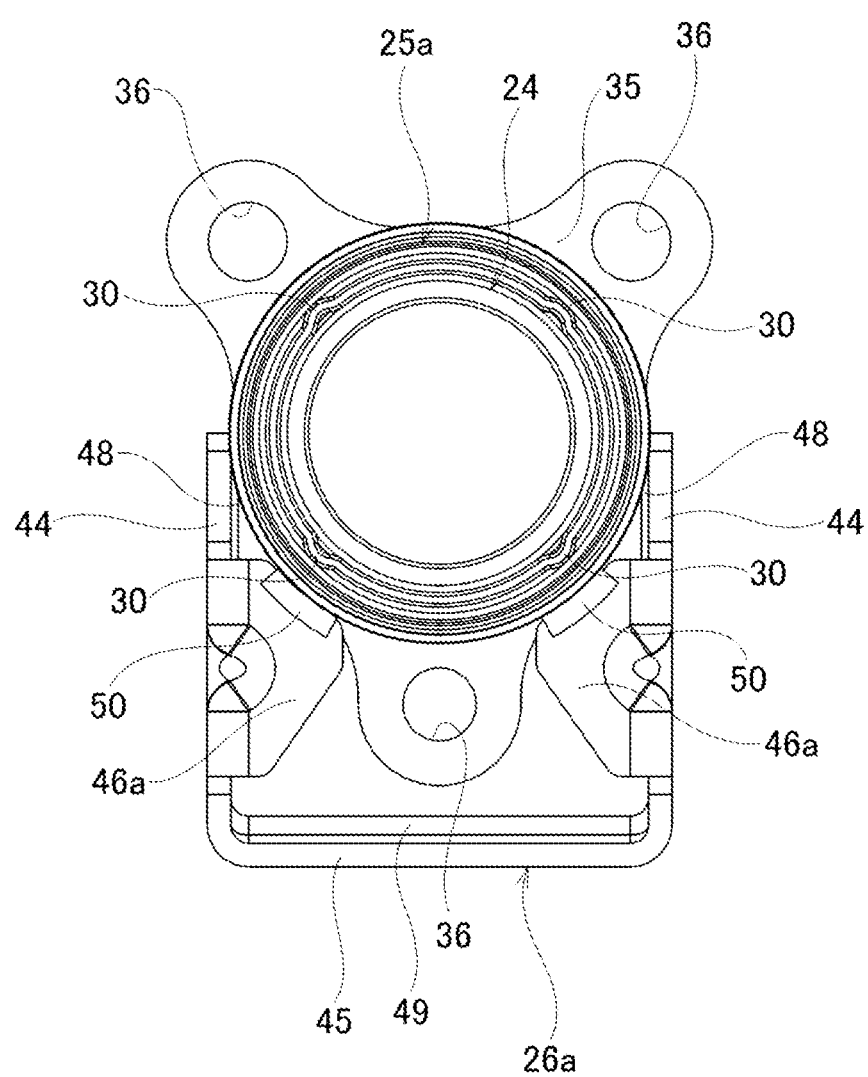
FIG. 18 is a view of the steering column illustrated in FIG. 14 as viewed from the rear side.
Figure 19:
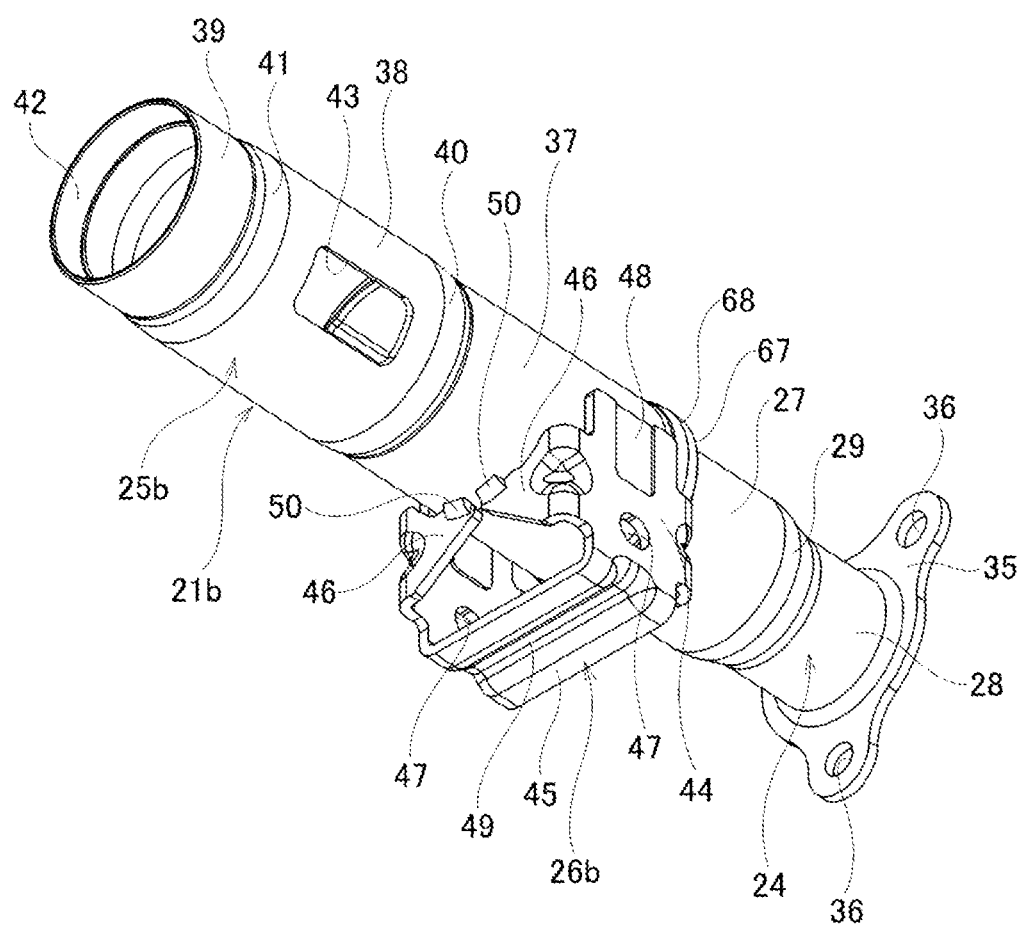
FIG. 19 is a perspective view of the steering column of a second example of an embodiment of the present invention as viewed from the lower side and the rear side.
Figure 20:
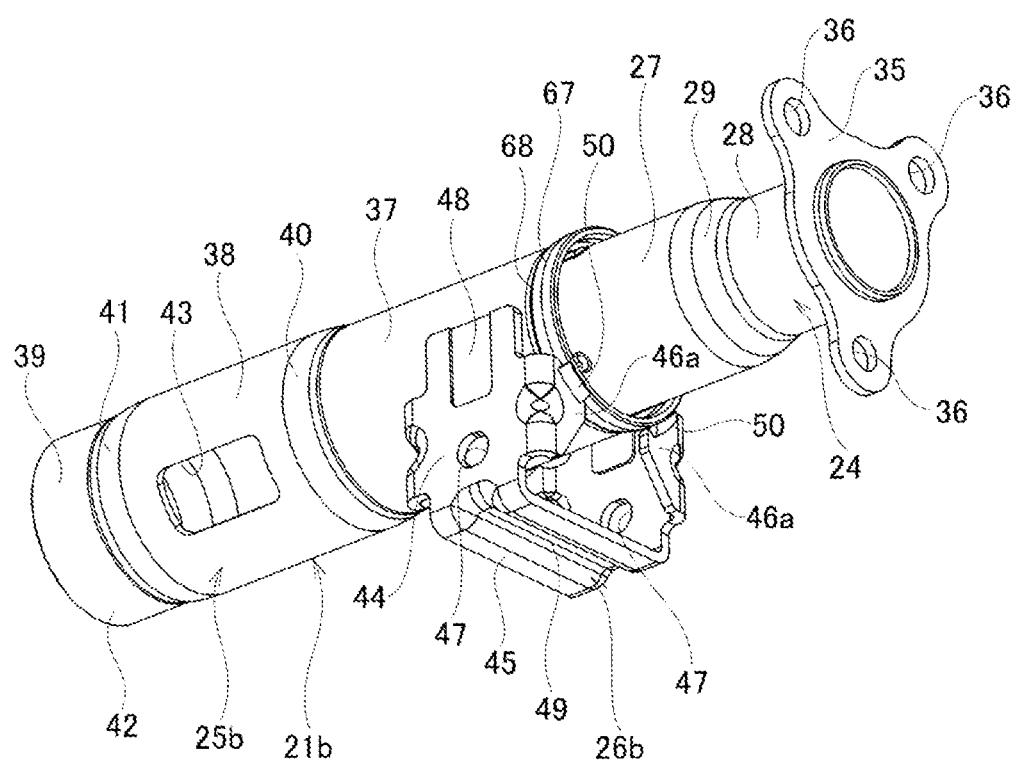
FIG. 20 is a perspective view of the steering column of the second example as viewed from the lower side and the front side.
Figure 21:
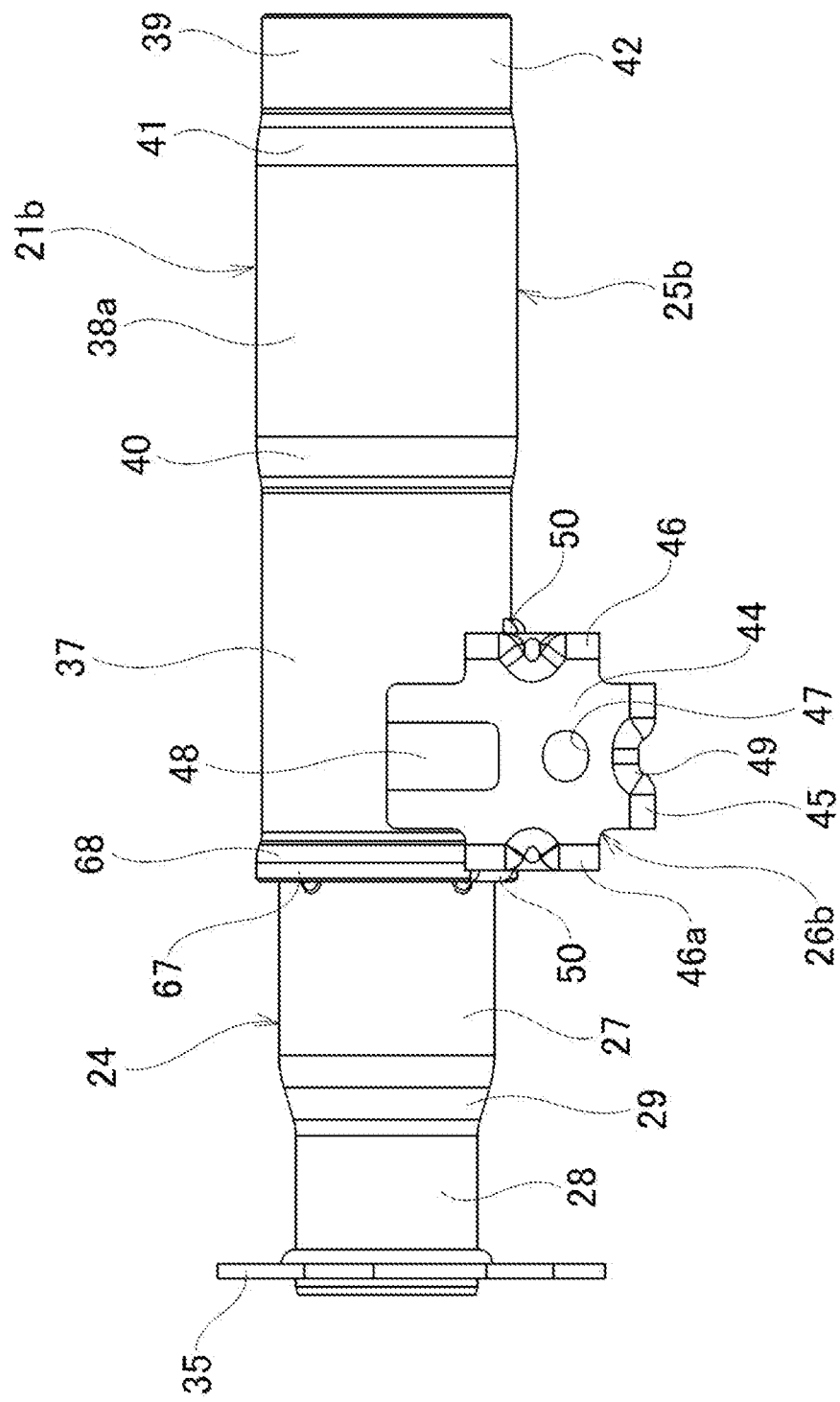
FIG. 21 is a side view of the steering column of the second example.
Figure 22:
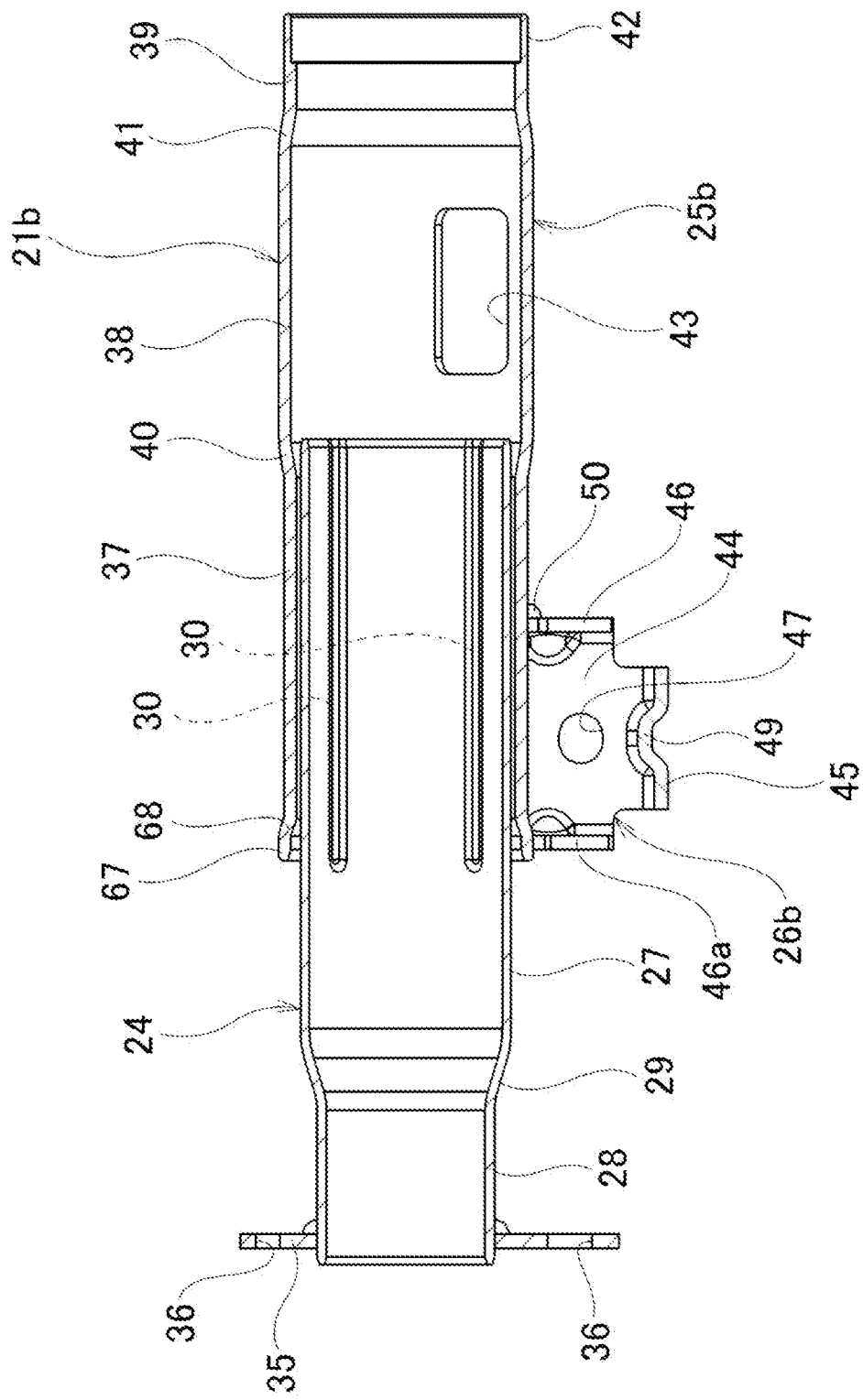
FIG. 22 is a view corresponding to section B-B in FIG. 2 of the steering column of the second example.

In this example, as illustrated in FIGS. 12 and 13, each of the support plate portions 54 has a substantially rectangular flat plate-shaped offset portion 56 offset toward the inside in the width direction with respect to the surrounding portion in an intermediate portion in the front-rear direction. The tilt adjustment elongated hole 55 is formed so as to penetrate the lower-side portion of the offset portion 56 in the width direction. The rigidity of each of the support plate portions 54 is increased by the presence of the offset portion 56.

As illustrated in FIG. 12, the offset portion 56 is arranged at a position facing the side plate portion 44 of the column-side bracket 26 in the width direction.

As illustrated in FIG. 2, the clamp mechanism 23 includes an adjusting rod 58, an adjusting nut 59, a cam device 60, an adjusting lever 61, and a thrust bearing 62.

The adjusting rod 58 is inserted in the width direction through a pair of tilt adjustment elongated holes 55 and a pair of through holes 47. The adjusting rod 58 has a head portion 63 at a base-end portion (left-end portion in FIG. 2) and a male screw portion 64 at the tip-end portion (right-end portion in FIG. 2). The adjusting nut 59 is screwed into the male screw portion 64. The cam device 60 is arranged between the head portion 63 and the support plate portion 54 on one side (left side in FIG. 2). The cam device 60 has a drive-side cam 65 located on the outside in the width direction and a driven-side cam 66 located on the inside in the width direction. The base-end portion of the adjusting lever 61 is fixed to the drive-side cam 65. The driven-side cam 66 engages with the tilt adjustment elongated hole 55 of one of the support plate portions 54 so that there is no relative rotation. When the drive-side cam 65 and the driven-side cam 66 are relatively rotated by swinging the adjusting lever 61 around the adjusting rod 58, due to the pressing of the side surfaces (cam surfaces) of the drive-side cam 65 and the driven-side cam 66 that face each other, the dimension in the axial direction of the cam device 60 expands or contracts. In this example, in a case where the adjusting lever 61 is swung in a specified direction, the dimension in the axial direction of the cam device 60 is increased, and in a case where the adjusting lever 61 is swung in a direction opposite the specified direction, the dimension in the axial direction of the cam device 60 is reduced. The thrust bearing 62 is arranged between the adjusting nut 59 and the other support plate portion 54 (right one in FIG. 2).

When adjusting the height position of the steering wheel 1, the clamp mechanism 23 is set to the unlocked state by swinging the adjusting lever 61 in a specified direction. In other words, when the adjusting lever 61 is swung in a specified direction (for example, downward), the dimension in the axial direction of the cam device 60 is reduced, and the space between the driven-side cam 66 and the thrust bearing 62 is widened. As a result, the frictional force acting between the inner side surface in the width direction of the pair of support plate portions 54 and the outer side surface in the width direction of the pair of side plate portions 44 is reduced or lost, and the column-side bracket 26 is in an unlocked state in which displacement of the column-side bracket 26 with respect to the vehicle-body-side bracket 22 is possible. In this unlocked state, by pivotally displacing the steering column 21a centered about the tilt shaft 34, the adjusting rod 58 is able to move inside the pair of tilt adjustment elongated holes 55, and the height position of the steering wheel 1 may be adjusted.

After adjusting the height position of the steering wheel 1, by swinging the adjusting lever 61 in the direction opposite to the specified direction (for example, upward), the clamp mechanism 23 is set to the locked state. In other words, when the adjusting lever 61 is swung in the direction opposite to the specified direction, the dimension in the axial direction of the cam device 60 is increased, and the distance between the driven-side cam 66 and the thrust bearing 62, which is a pair of pressing portions, is shortened, and as a result, the distance between the pair of support plate portions 54 is reduced. As a result, the frictional force acting between the inner side surface in the width direction of the pair of support plate portions 54 and the outer side surface in the width direction of the pair of side plate portions 44 is increased, and the column-side bracket 26 is in a locked state in which displacement of the column-side bracket 26 with respect to the vehicle-body-side bracket 22 is not possible. In this locked state, the steering wheel 1 is held at the adjusted height position.

In this example, the welding locations of the column-side bracket 26 with respect to the outer column 25 are two locations (where the weld bead portions 50 exist) close to each other in the circumferential direction on each of both sides of the column-side bracket 26 in the front-rear direction. Moreover, in the state of the steering column 21 alone, there is a minute gap between each upper-side portion of the pair of side plate portions 44 and both side portions in the width direction of the front-side small-diameter tubular portion 37 of the outer column 25. However, in the structure of this example, regardless of the existence of such a minute gap, the support rigidity in the width direction of the column-side bracket 26 and the outer column 25 by the pair of support plate portions 54 may be sufficiently ensured in the locked state.

In the structure of this example, when the distance between the driven-side cam 66 and the thrust bearing 62 is shortened due to swinging of the adjusting lever 61 when setting the locked state, an inward load P in the width direction acts on the outer-side surfaces of the pair of support plate portions 54 from both the driven-side cam 66 and the thrust bearing 62. As a result, first, each of the pair of support plate portions 54 swings toward the inside in the width direction with the upper-end portion as the center. Then, the inner-side surface of each of the lower-side portions of the pair of support plate portions 54 comes in contact with the outer-side surface of each of the lower-end portions of the pair of side plate portions 44 of the column-side bracket 26. The location of this contact becomes a first fulcrum S1. In the structure of this example, the connecting plate portion 45 that connects the lower-end portions of the pair of side plate portions 44 has a reinforcing rib 49 at an intermediate portion in the front-rear direction, and the rigidity is enhanced by the reinforcing rib 49. Therefore, the load applied to the first fulcrum S1 from each of the pair of support plate portions 54 may be sufficiently supported by the connecting plate portion 45.

Next, due to the action of the load P, each of the pair of support plate portions 54 is elastically deformed such that the inside in the width direction becomes convex as illustrated by the thick broken line in FIG. 13. Then, the inner-side surface of each of the upper-side portions of the pair of support plate portions 54 comes in contact with the outer-side surface of each of the upper-side portions of the pair of side plate portions 44 of the column-side bracket 26. As a result, the upper-side portions of the pair of side plate portions 44 are displaced toward the inside in the width direction. Then, the inner side surfaces of each upper-side portions of the pair of side plate portions 44 (inner side surfaces of the offset portions 48) come in contact with both side surfaces in the width direction of the front-side small-diameter tubular portion 37 of the outer column 25. In other words, the minute gaps existing between the upper-side portions of the pair of side plate portions 44 and both side portions in the width direction of the front-side small-diameter tubular portion 37 of the outer column 25 disappear. In this state, the contact portion between the inner-side surface of the upper-side portions of the pair of support plate portions 54 and the outer-side surfaces of the upper-side portions of the pair of side plate portions 44 of the column-side bracket 26 becomes a second fulcrum S2. In the structure of this example, each of the pair of side plate portions 44 has an offset portion 48 that is offset toward the inside in the width direction with respect to the surrounding portion in an intermediate portion in the front-rear direction of the upper-side portion. Therefore, the rigidity of each of the pair of side plate portions 44 may be increased based on the presence of the offset portions 48, and as a result, each of the pair of side plate portions 44 is suppressed from being elastically deformed in a direction illustrated by the thick broken line in FIG. 13. Moreover, of the inner-side surfaces of the pair of side plate portions 44, the locations that come in contact with both side surfaces in the width direction of the front-side small-diameter tubular portion 37 of the outer column 25 may be limited to the inner-side surfaces of the offset portion 48. Therefore, the inner-side surfaces of the pair of side plate portions 44 may be accurately brought into contact with both side surfaces in the width direction of the front-side small-diameter tubular portion 37 of the outer column 25 over a specified contact area. In the structure of this example, the front-side small-diameter tubular portion 37 of the outer column 25 is composed of a part of the raw pipe which is the raw material of the outer column 25. The outer-circumferential surface of the raw pipe is a cylindrical surface having high shape accuracy (roundness). Therefore, also by this, the inner side surfaces of the offset portions 48 of the pair of side plate portions 44 are accurately brought into contact with both side surfaces in the width direction of the front-side small-diameter tubular portion 37 of the outer column 25 with a specified contact area.

As described above, in the structure of this example, in the locked state, the minute gaps existing between the upper-side portions of the pair of side plate portions 44 and both side portions in the width direction of the front-side small-diameter tubular portion 37 of the outer column 25 disappear, and there are a total of four fulcrums, two lower-side first fulcrums S1 and two upper-side second fulcrums S2, between the pair of support plate portions 54 and the column-side bracket 26. As a result, it is possible to sufficiently secure the support rigidity in the width direction of the column-side bracket 26 and the outer column 25 by the pair of support plate portions 54.

When an automobile has a collision accident and a secondary collision occurs in which the driver's body collides with the steering wheel 1, an impact load toward the front is applied to the outer column 25 and the vehicle-body-side bracket 22 from the steering wheel 1 via the rear-side shaft 52. Due to this impact load, the vehicle-body-side bracket 22 is detached toward the front with respect to the vehicle body, and the outer column 25, the rear-side shaft 52, and the steering wheel 1 displace toward the front with respect to the inner column 24 and the front-side shaft 51. At this time, the impact load at the time of the secondary collision is absorbed due to sliding in the axial direction of the outer-circumferential surface of the large-diameter tubular portion 27 of the inner column 24 and the inner-circumferential surface of the front-side small-diameter tubular portion 37 of the outer column 25.

In this example, the contact locations of the outer-circumferential surface of the large-diameter tubular portion 27 of the inner column 24 with the inner-circumferential surface of the front-side small-diameter tubular portion 37 of the outer column 25 are limited to the portions corresponding to the respective top portions of the ridges 30. In other words, at the time of the secondary collision, of the outer-circumferential surface of the large-diameter tubular portion 27 of the inner column 24, only the portions corresponding to the top portions of the ridges 30 slide in the axial direction with the inner-circumferential surface of the front-side small-diameter tubular portion 37 of the outer column 25. Therefore, at the time of a secondary collision, the outer-circumferential surface of the large-diameter tubular portion 27 of the inner column 24 and the inner-circumferential surface of the front-side small-diameter tubular portion 37 of the outer column 25 are able to stably slide in the axial direction, and absorption performance of the impact load may be stabilized.

The steering device of this example absorbs the impact load at the time of the secondary collision due to sliding in the axial direction of the outer-circumferential surface of the inner column 24 and the inner-circumferential surface of the outer column 25, and thus from the aspect of sufficiently protecting the driver, it is important to keep the resistance in the axial direction between the inner column 24 and the outer column 25, or in other words, the press-fitting load F of the outer-circumferential surface of the inner column 24 with respect to the inner-circumferential surface of the outer column 25 within an appropriate range. In this regard, in the steering device of this example, it is easy to keep the press-fitting load F of the outer-circumferential surface of the inner column 24 with respect to the inner-circumferential surface of the outer column 25 within an appropriate range.

In the structure of this example, the front-side small-diameter tubular portion 37 of the outer column 25 is composed of a part of the raw pipe which is the raw material of the outer column 25. The inner-circumferential surface of the raw pipe is a cylindrical surface having a highly accurate shape (roundness) and small variation in the inner-diameter dimension. Therefore, the inner-circumferential surface of the front-side small-diameter tubular portion 37 is also a cylindrical surface having highly accurate shape and small variation in the inner-diameter dimension. Accordingly, it is possible to reduce variation in the interference $\lambda$ of the fitting portion between the large-diameter tubular portion 27 of the inner column 24 and the front-side small-diameter tubular portion 37 of the outer column 25, which is the interference at the contact portions between the inner-circumferential surface of the front-side small-diameter tubular portion 37 and the plurality of ridges 30, by that amount.

In the structure of this example, the amount of deformation of the front-side small-diameter tubular portion 37 due to welding of the column-side bracket 26 to the front-side small-diameter tubular portion 37 of the outer column 25 may be reduced. Therefore, it is possible to reduce the amount of increase in the variation in the interference $\lambda$ of the fitting portion between the large-diameter tubular portion 27 of the inner column 24 and the front-side small-diameter tubular portion 37 of the outer column 25 caused by such deformation.

Accordingly, in the structure of this example, it is not necessary to make the accuracy of the inner column 24 and the outer column 25 excessively high in order to keep the press-fitting load F within an appropriate range. Moreover, in order to keep the press-fitting load F within an appropriate range, the work of selectively combining the inner column 24 and the outer column 25 becomes unnecessary, or even in a case where this work is necessary, the work time may be shortened. Therefore, the manufacturing cost of the steering device may be kept low.

Reference Example

A reference example related to the present invention will be described with reference to FIGS. 14 to 18.

In this reference example, the outer column 25*a* of the steering column 21*a* includes a cylindrical front-side large-diameter tubular portion 67 that is positioned further on the front side than the front-side small-diameter tubular portion 37a. The inner-diameter dimension of the front-side large-diameter tubular portion 67 is larger than the inner-diameter dimension of the front-side small-diameter tubular portion 37a. The rear-side end portion of the front-side large-diameter tubular portion 67 and the front-side end portion of the front-side small-diameter tubular portion 37a are connected by a conical tubular connecting portion 68 having an inner-diameter dimension that increases going toward the front side. The inner-circumferential surface of the front-side large-diameter tubular portion 67 and the inner-circumferential surface of the connecting portion 68 are not in contact with the plurality of ridges 30 of the inner column 24. In other words, in this reference example, as in the first example, the large-diameter tubular portion 27 of the inner column 24 is press-fitted only into the front-side small-diameter tubular portion 37a of the outer column 25a. The plurality of ridges 30 of the inner column 24 are in contact in a state in which there is interference only with the inner-circumferential surface of the front-side small-diameter tubular portion 37a of the inner-circumferential surface of the outer column 25a.

The position in the axial direction of the front-side large-diameter tubular portion 67 of the outer column 25a coincides with the position in the axial direction of the front-side end portion of the column-side bracket 26a. The position in the axial direction of the front-side end portion of the large-diameter tubular portion 38a of the outer column 25a coincides with the position in the axial direction of the rear-side end portion of the column-side bracket 26a. Each of the fixing plate portions 46a of the column-side bracket 26a has a shorter dimension in the width direction than in the case of the first example. The inner end portions in the width direction, which are the respective tip-end portions of the fixing plate portions 46a, are positioned below both side portions in the width direction of the outer column 25a.

In this reference example as well, as in the first example, in order to fix the column-side bracket 26a to the outer column 25a, only the edge portions on the upper ends of the tip-end portions of the fixing plate portions 46a of the column-side bracket 26a are welded and joined to the lower surface of outer column 25 by weld bead portions 50. However, in this reference example, the positions of the weld bead portions 50, which are welded portions, are different from those of the first example.

In this reference example, the edge portions of the upper ends of the tip-end portions of the pair of fixing plate portions 46a located on the front side of the column-side bracket 26a are welded and joined to the lower surface of both side portions in the width direction of the front-side large-diameter tubular portion 67 of the outer column 25a by weld bead portions 50. The edge portions of the upper ends of the tip-end portions of the pair of fixing plate portions 46a located on the rear side of the column-side bracket 26a are welded and joined to the lower surfaces of both side portions in the width direction of the front-side end portion of the large-diameter tubular portion 38 of the outer column 25a by the weld bead portions 50.

In this reference example, the welded locations of the column-side bracket 26a with respect to the outer column 25a are portions (front-side large-diameter tubular portion 67, front-side end portion of the large-diameter tubular portion 38) of the outer column 25a that are separated in the axial direction from the portion (front-side small-diameter tubular portion 37a) in which the inner column 24 is press fitted. Therefore, it is possible to prevent or suppress the deformation of the outer column 25a due to welding from reaching the portion (front-side small-diameter tubular portion 37a) of the outer column 25a in which the inner column 24 is press-fitted. Therefore, it is possible to suppress the amount of increase in the variation in the interference λ of the fitting portion between the large-diameter tubular portion 27 of the inner column 24 and the front-side small-diameter tubular portion 37a of the outer column 25a caused by the deformation. Accordingly, it becomes easy to keep the press-fitting load F on the outer-circumferential surface of the large-diameter tubular portion 27 of the inner column 24 with respect to the inner-circumferential surface of the front-side small-diameter tubular portion 37a of the outer column 25a within an appropriate range by that amount.

In this reference example, on each of both sides in the front-rear direction of the column-side bracket 26a, the distance in the circumferential direction between the two weld bead portions 50 is larger than in the case of the first example. Therefore, the support rigidity of the column-side bracket 26a with respect to the outer column 25a may be increased.

As a modification of this reference example, two weld bead portions may be arranged close to each other in the circumferential direction as in the first example on at least one side of both sides in the front-rear direction of the column-side bracket. In this case, the amount of deformation of the outer column due to welding on the at least one side may be made smaller than in the case of this reference example. Accordingly, the amount of increase in the variation in the interference λ of the fitting portion between the inner column and the outer column caused by such deformation may be made smaller. Other configurations and operational effects are the same as in the first example.

Second Example

A second example of an embodiment of the present invention will be described with reference to FIGS. 19 to 22.

In this example, the configuration of the front-side end portion of the outer column 25b of the steering column 21b, the configuration of the pair of fixing plate portions 46a located on the front side of the column-side bracket 26b, and the configuration relating to welded joints of the pair of fixing plate portions 46a located on the front side of the column-side bracket 26b with respect to the front-side end portion of the outer column 25b are the same as in the reference example.

In other words, the outer column 25b includes a front-side large-diameter tubular portion 67 and a connecting portion 68 similar to those in the reference example at the front-side end portion. Each of the pair of fixing plate portions 46a located on the front side of the column-side bracket 26b has a shorter dimension in the width direction than in the case of the first example. The edge portions of the upper ends of the tip-end portions of the pair of fixing plate portions 46a located on the front side of the column-side bracket 26b are welded and joined to the lower surfaces of both side portions in the width direction of the front-side large-diameter tubular portion 67 of the outer column 25b by the weld bead portions 50.

The other configurations are the same as in the first example. In other words, in this example, the pair of fixing plate portions 46 located on the rear side of the column-side bracket 26b is welded and joined to the lower surface of the front-side small-diameter tubular portion 37 of the outer column 25b by weld bead portions 50 that are close to each other in the circumferential direction.

In the structure of this example, the distance in the circumferential direction between the two weld bead portions 50 on the front side of the column-side bracket 26b is larger than that in the case of the first example. Therefore, the support rigidity of the column-side bracket 26b with respect to the outer column 25b may be increased as compared with the case of the first example. The dimension in the axial direction of the front-side small-diameter tubular portion 37, which is the portion of the outer column 25a where the inner column 24 is internally fitted by press fitting, is larger than that in the reference example. Therefore, the impact absorption stroke at the time of the secondary collision may be made longer than that in the case of the reference example. The other operational effects are the same as those of the first example and the reference example.

The structure of each example of an embodiment of the present invention and the structure of the reference example may be appropriately combined and implemented as long as there is no contradiction.

In a case of implementing the present invention, a configuration may be adopted in which the column-side bracket is arranged on the upper side of the portion of the outer column into which the inner column is press-fitted.

In a case of implementing the present invention, a configuration may be adopted in which the inner-circumferential surface of the outer column and the outer-circumferential surface of the inner column come in contact in a state in which there is interference fit via another member at only a plurality of locations that are separated in the circumferential direction. In this case, as the other member, a metal wire material or the like arranged in the axial direction may be used for example.

REFERENCE SIGNS LIST

1 Steering wheel
2, 2a Steering shaft
3, 3a Steering column
4a, 4b Universal joint
5 Intermediate shaft
6 Steering gear unit
7 Pinion shaft
8 Tie rod
9 Inner column
10 Outer column
11 Ridge
12 Electric assist device
13 Gear housing
14 Tilt shaft
15 Column-side bracket
16 Side plate portion
17 Vehicle-body-side bracket
18 Clamp mechanism
19 Support plate portion
20 Steering shaft
21, 21a, 21b Steering column
22 Vehicle-body-side bracket
23 Clamp mechanism
24 Inner column
25, 25a, 25b Outer column
26, 26a, 26b Column-side bracket
27 Large-diameter tubular portion
28 Small-diameter tubular portion
29 Connecting portion
30 Ridge
31 Electric assist device
32 Gear housing
33 Electric motor
34 Tilt shaft
35 Mounting plate
36 Mounting hole
37, 37a Front-side small-diameter tubular portion
38, 38a Large-diameter tubular portion
39 Rear-side small-diameter tubular portion
40 Front-side connecting portion
41 Rear-side connecting portion
42 Bearing support portion
43 Key lock hole
44 Side plate portion
45 Connecting plate portion
46, 46a Fixing plate portion
47 Through hole
48 Offset portion
49 Reinforcing rib
50 Weld bead portion
51 Front-side shaft
52 Rear-side shaft
53 Mounting plate portion
54 Support plate portion
55 Tilt adjustment elongated hole
56 Offset portion
58 Adjusting rod
59 Adjusting nut
60 Cam device
61 Adjusting lever
62 Thrust bearing
63 Head portion
64 Male screw portion
65 Drive-side cam
66 Driven-side cam
67 Front-side large-diameter tubular portion
68 Connecting portion
69 Rear-side shaft
70 Front-side shaft

The invention claimed is:

1. A steering column comprising:
a tubular outer column;
a tubular inner column internally fitted and supported inside the outer column; and
a column-side bracket fixed by welding to an outer-circumferential surface of the outer column;
the outer column having a press-fitted portion into which the inner column is press-fitted to an inner-diameter side; and
an inner-circumferential surface of the press-fitted portion and an outer-circumferential surface of the inner column coming in contact with each other with an interference fit directly or via another member only at a plurality of contact locations separated in a circumferential direction; wherein
the column-side bracket includes:
a connecting plate portion,
a pair of side plate portions bent in a vertical direction from both end portions in a width direction of the connecting plate portion and sandwiching the outer column from both sides in the width direction, and
two pair of fixing plate portions respectively bent toward the inside in the width direction from a front-end portion and a rear-end portion in a front-rear direction of the pair of side plate portions, and
of the column side bracket, only the two pair of fixing plate portions are welded to the outer circumferential surface of the outer column,
of the two pair of fixing plate portions, tip edge portions of at least one pair of fixing plate portions are close to each other in the width direction, and tip end portions of the at least one pair of fixing plate portions are welded to the outer-circumferential surface of the press-fitted portion at only two weld locations that are close in the circumferential direction, and the two weld locations exist within a circumferential range located between two contact locations adjacent in the circumferential direction among the plurality of contact locations at positions separated in the circumferential direction from the two contact locations.

2. The steering column according to claim 1 wherein the tip edge portions are close to each other in the width direction for both of the two pair of fixing plate portions, and the tip end portions are welded to the outer-circumferential surface of the press-fitted portion at only two weld locations that are close in the circumferential direction for both of the two pair of fixing plate portions.

3. The steering column according to claim 1 wherein the inner column has ridges that protrude toward the outside in a radial direction and extend in an axial direction at a plurality of locations separated in the circumferential direction of the outer-circumferential surface corresponding to the plurality of contact locations, and only a portion of the outer-circumferential surface of the inner column corresponding to the top portions of each of the ridges comes into contact with the inner-circumferential surface of the press-fitted portion with an interference fit.

4. The steering column according to claim 1 wherein a minute gap is provided between each of upper-side portions of the pair of side plate portions and the outer peripheral surface of the press-fitted portion in a state of the steering column alone.

5. The steering column according to claim 1 wherein each of the pair of side plate portions has an offset portion in an intermediate portion in the front-rear direction of a portion on an opposite side to the connecting plate portion in the vertical direction that is offset toward the inside in the width direction with respect to a surrounding portion thereof.

6. The steering column according to claim 1 wherein the connecting plate portion has a reinforcing rib extending in the width direction.

7. The steering column according to claim 1 wherein the column-side bracket is made of a metal plate, and a difference between a thickness dimension of the metal plate of the column-side bracket and a thickness dimension of the press-fitted portion is 30% or less the thickness dimension of the press-fitted portion.

8. The steering column according to claim 1, wherein the circumferential range in which the two weld locations exist is 30° or less when represented by a center angle centered on a center axis of the outer column, and the space in the circumferential direction between the two weld locations is 15° or less when represented by the center angle.

9. A steering device comprising:
a steering column,
a vehicle-body-side bracket, and
a clamp mechanism; wherein
the steering column includes the steering column according to claim 1;
the vehicle-body-side bracket has a pair of support plate portions that sandwich the outer column and the column-side bracket from both sides in the width direction, and a tilt adjustment elongated hole formed in each of the pair of support plate portions and extends in the vertical direction, and is able to be supported by the vehicle body; and
the clamp mechanism has an adjusting rod that is inserted in the width direction through the respective tilt adjustment elongated holes of the pair of support plate portions and the column-side bracket, and a pair of pressing portions that are arranged at both side portions in the axial direction of the adjusting rod that protrudes toward the outside in the axial direction of the pair of support plate portions, and that by expanding or contracting the distance in the width direction therebetween, are able to expand or contract the distance in the width direction between the pair of support plate portions.

10. The steering device according to claim 9, wherein the inner column is arranged on the front side of the outer column, and is supported with respect to the vehicle in a state in which displacement toward the front is prevented.

11. The steering device according to claim 9, wherein a minute gap is provided between each of upper-side portions of the pair of side plate portions and the outer peripheral surface of the press-fitted portion, and
in a state that the distance in the width direction between the pair of pressing portions is shortened, the minute gap provided between each of the upper-side portion of the pair of side plate portions and the outer peripheral surface of the press-fitted portion disappears, and the upper-side portions of the pair of side plate portions come in contact with the outer peripheral surface of the press-fitted portion.

\* \* \* \* \*